(12) United States Patent
Kakutani

(10) Patent No.: US 10,757,297 B2
(45) Date of Patent: Aug. 25, 2020

(54) IMAGE PROCESSING APPARATUS, IMAGE PROCESSING METHOD, AND PRINTING APPARATUS

(71) Applicant: SEIKO EPSON CORPORATION, Tokyo (JP)

(72) Inventor: Toshiaki Kakutani, Nagano (JP)

(73) Assignee: Seiko Epson Corporation, Tokyo (JP)

(*) Notice: Subject to any disclaimer, the term of this patent is extended or adjusted under 35 U.S.C. 154(b) by 0 days.

(21) Appl. No.: 16/599,148

(22) Filed: Oct. 11, 2019

(65) Prior Publication Data
US 2020/0120234 A1    Apr. 16, 2020

(30) Foreign Application Priority Data
Oct. 15, 2018   (JP) ................. 2018-193944

(51) Int. Cl.
*H04N 1/40*    (2006.01)
*H04N 1/405*   (2006.01)
*H04N 1/52*    (2006.01)

(52) U.S. Cl.
CPC ........ *H04N 1/4052* (2013.01); *H04N 1/405* (2013.01); *H04N 1/52* (2013.01)

(58) Field of Classification Search
None
See application file for complete search history.

(56) References Cited

U.S. PATENT DOCUMENTS 8,213,054 B2* 7/2012 Suzuki .......... H04N 1/4052 345/616
8,947,735 B2* 2/2015 Kodama ........ H04N 1/4052 358/3.03

(Continued)

FOREIGN PATENT DOCUMENTS

JP   2005-012726 A   1/2005
JP     3963598 B2    8/2007

(Continued)

*Primary Examiner* — Dung D Tran
(74) *Attorney, Agent, or Firm* — Global IP Counselors, LLP

(57) ABSTRACT n (n is an integer that is equal to or greater than 2) error diffusion processing units are respectively provided to correspond to division images obtained by dividing an image into n images in a main scanning direction, and at least a part of halftone processing on two division images is performed simultaneously. When one error diffusion processing unit that processes the division image which is positioned ahead in the main scanning direction processes one of rasters up to an end portion in the main scanning direction to obtain diffusion errors that are diffused into pixels in the neighborhood of an objective pixel, the one error diffusion processing unit delivers a forward-direction diffusion error to the other error diffusion processing unit. Furthermore, other error diffusion processing unit that receives the forward-direction diffusion error starts the halftone processing on one raster, obtains the diffusion error in an end portion in an opposite direction, and then delivers an opposite-direction diffusion error that is a diffusion error which is used by the one error diffusion processing unit in the halftone processing of a subsequent raster, among the diffusion errors, to the one error diffusion processing unit.

8 Claims, 17 Drawing Sheets

(56) References Cited

U.S. PATENT DOCUMENTS

| | | | | |
|---|---|---|---|---|
| 8,958,114 | B2* | 2/2015 | Abello | H04N 1/1903 347/116 |
| 2004/0257623 | A1* | 12/2004 | Suzuki | H04N 1/405 358/3.03 |
| 2006/0120787 | A1* | 6/2006 | Abello | G06K 15/1857 400/76 |
| 2009/0161165 | A1* | 6/2009 | Fujimoto | G06K 15/107 358/2.1 |
| 2011/0128561 | A1* | 6/2011 | Goto | H04N 1/1915 358/1.9 |
| 2012/0050814 | A1* | 3/2012 | Tanaka | H04N 1/4052 358/3.03 |
| 2012/0050815 | A1* | 3/2012 | Kodama | H04N 1/4052 358/3.03 |
| 2012/0051659 | A1* | 3/2012 | Ashida | H04N 1/4053 382/252 |
| 2015/0220824 | A1* | 8/2015 | Kikuta | H04N 1/4051 358/3.05 |
| 2016/0173724 | A1 | 6/2016 | Kakutani et al. | |
| 2020/0068091 | A1* | 2/2020 | Kakutani | H04N 1/4052 |

FOREIGN PATENT DOCUMENTS

| | | |
|---|---|---|
| JP | 4096949 B2 | 6/2008 |
| JP | 5487882 B2 | 5/2014 |
| JP | 2016-116105 A | 6/2016 |

\* cited by examiner

IMAGE PROCESSING APPARATUS, IMAGE PROCESSING METHOD, AND PRINTING APPARATUS

The present application is based on, and claims priority from JP Application Serial Number 2018-193944, filed Oct. 15, 2018, the disclosure of which is hereby incorporated by reference herein in its entirety.

BACKGROUND

1. Technical Field

The present disclosure relates to image processing that uses an error diffusion method, and a printing technology that uses the image processing.

2. Related Art

When a multi-gradation image is reproduced using a set of dots or pixels that have a smaller gradation number than the multi-gradation image, in order to realize high quality of an image that is to be reproduced, it is important how an arrangement of dots is determined. The technology is generally referred to as halftone processing. In the related art, an error diffusion method is known as a technique for performing high quality halftone processing.

In the error diffusion method, when it is determined whether or not a dot is formed on one pixel (hereinafter also referred to as an objective pixel) that is a target for processing, a difference between a gradation value that pixel originally has and a gradation value obtained by conversion of density depending on the formation or non-formation of a dot is obtained as a gradation error, and is distributed, as a diffusion error, to pixels in the neighborhood of the objective pixel, which are not yet processing. The error is diffused into the neighborhood of the pixel that is the target for processing, and, for a pixel into which the error is diffused, the determination of the formation or non-formation of the dot and the diffusion of the error are continued in the same manner. Thus, a gradation value of the entire image is a gradation value of an original image, and a distribution of dots that are formed depends on a gradation of the original image as well.

The diffusion of the error is performed on multiple pixels in the neighborhood of the objective pixel. For this reason, an arithmetic operation of the error that is diffused into each pixel and an error buffer for adding up errors that are distributed are necessary for the diffusion of the error. As a result, the time for the arithmetic operation of the error that is diffused is required and a large-scale high-speed memory is necessary. Thus, it is considered that the original image is divided into multiple areas, that the halftone processing that uses the error diffusion method is performed concurrently for every area, and thus that a speedup is achieved. Inventors and others propose printing apparatuses that perform concurrent processing for the error diffusion method, as technologies in Japanese Patent Nos. 3963598 and 4096949, and other documents.

These technologies are excellent in that a pseudo-contour does not occur at the border between division images that are concurrently processed, but the inventor found a configuration in which the halftone processing that uses the error diffusion method is concurrently performed in a more efficient manner.

SUMMARY

An image processing apparatus according to an aspect of the present disclosure sequentially performs halftone processing of a two-dimensional image, extending in lengthwise and crosswise directions and including a plurality of pixels, in one of the lengthwise and crosswise directions as a main scanning direction. The image processing apparatus includes n (n is an integer of 2 or more) error diffusion processing units that are respectively provided to correspond to division images obtained by dividing the image into n images in the main scanning direction, sequentially set pixels belonging to a raster which is a row of pixels in the main scanning direction of the division image as an objective pixel, and apply an error diffusion method to the objective pixel to perform the halftone processing, and an output unit that combines results processed by the n error diffusion processing units and outputs the processed data having a gradation value less than a gradation value that the division image has. At this point, among the n error diffusion processing units, two error diffusion processing units that perform the halftone processing on two division images, respectively, which are adjacent to each other in the main scanning direction may simultaneously perform at least a part of the halftone processing on an (N+1)-th (N is an integer of 1 or more) raster of one division image that is positioned ahead in the main scanning direction, and at least a part of the halftone processing on an N-th raster of the other division image adjacent to the one division image. When one error diffusion processing unit that processes the division image positioned ahead in the main scanning direction processes the N-th raster up to an end portion in the main scanning direction to obtain diffusion errors that are diffused into pixels in the neighborhood of the objective pixel in the N-th raster in the end portion in the main scanning direction, the one error diffusion processing unit delivers a forward-direction diffusion error that is a forward-direction diffusion error that is a diffusion error used by the other error diffusion processing unit and is determined for at least the N-th raster, among the diffusion errors, to the other error diffusion processing unit before the other error diffusion processing unit starts the halftone processing on the N-th raster of the other division image. The other error diffusion processing unit may receive the determined forward-direction diffusion error in the N-th raster of the one division image from the one error diffusion processing unit, then may start the halftone processing on the N-th raster of the other division image, may obtain diffusion errors that are diffused into the pixels in the neighborhood of the objective pixel in the N-th raster in an end portion in a direction opposite to the main scanning direction, and then may deliver an opposite-direction diffusion error that is determined for at least the (N+1)-th raster among opposite-direction diffusion errors that are diffusion errors which, among the diffusion errors, are used by the one error diffusion processing unit in the halftone processing on the (N+1)-th raster of the one division image, until the halftone processing on the (N+1)-th raster by the one error diffusion processing unit is performed up to the end portion in the main scanning direction.

DESCRIPTION OF EXEMPLARY EMBODIMENTS

A. First Embodiment

1. HARDWARE CONFIGURATION

Figure 1:
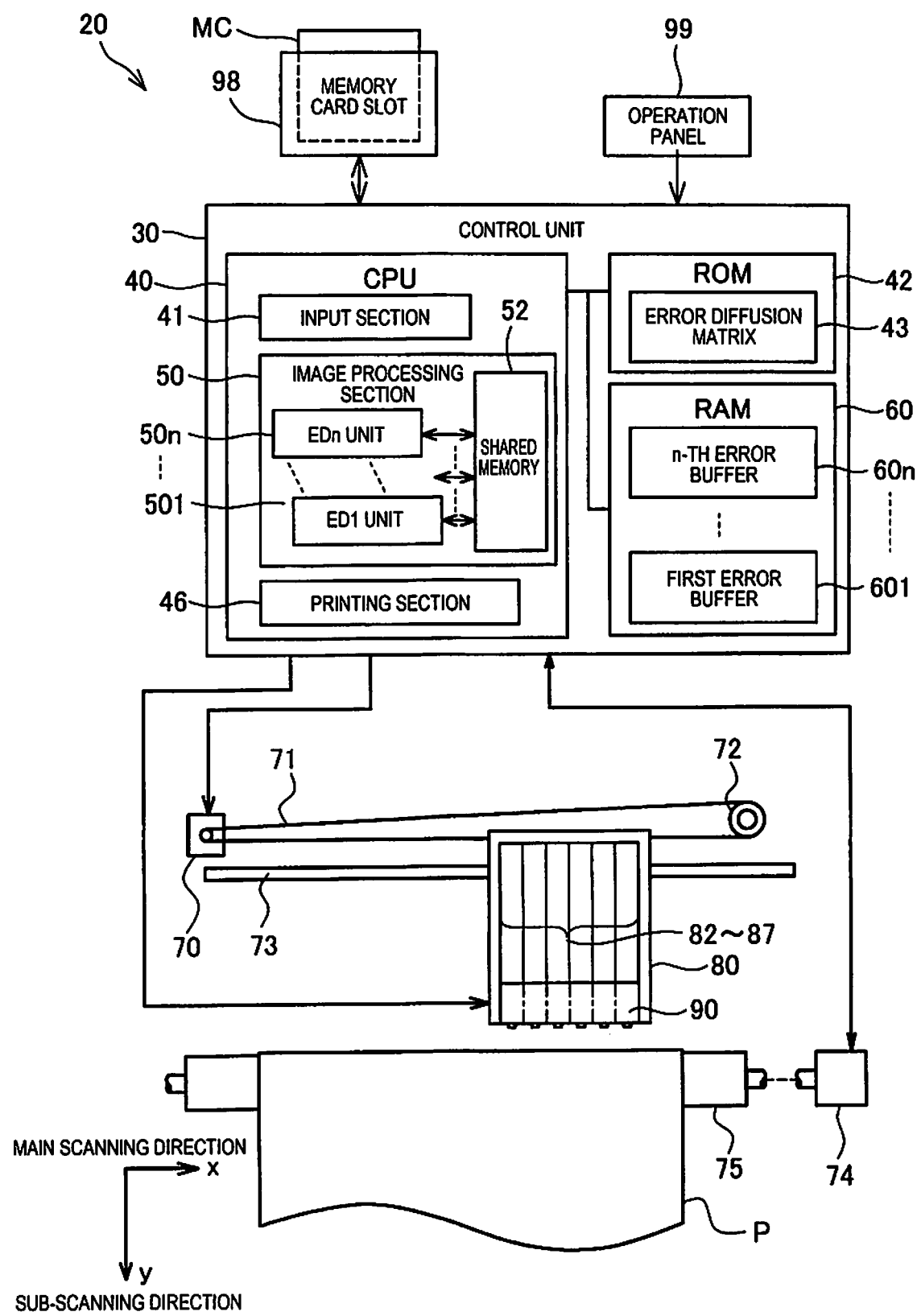
FIG. 1 is a diagram illustrating a schematic configuration of a printer as a printing apparatus according to a first embodiment.

FIG. 1 is a diagram illustrating a schematic configuration of a printer 20 that includes an image processing apparatus according to a first embodiment. The printer 20 is a serial-type ink jet printer that performs bidirectional printing. The printer 20, as illustrated, is configured with a mechanism that transports a printing medium P using a paper feeding motor 74, a mechanism that reciprocates a carriage 80 in an axial direction of a platen 75 using a carriage motor 70, a mechanism that drives a printing head 90 mounted on the carriage 80 and thus performs ink discharging and dot formation, and a control unit 30 administers signal exchanges among the paper feeding motor 74, the carriage motor 70, the printing head 90, a memory card slot 98, and an operation panel 99.

The mechanism that reciprocates the carriage 80 in the axial direction of the platen 75 is configured with a sliding axis 73 that is installed in parallel with as axis of the platen 75 and retains the carriage 80 in a slidable manner and a pulley 72 that stretches an endless drive belt 71 between itself and the carriage motor 70, and the like.

Mounted on the carriage 80 are ink cartridges 82 to 87 for color ink that accommodate cyanogen ink C, magenta ink M, yellow ink Y, black ink K, light cyanogen ink Lc, and light magenta ink Lm, respectively, as color link. A row of nozzles each of which corresponds to the color ink for colors described above is formed on the printing head 90 that occupies a lower portion of the carriage 80. When the ink cartridges 82 to 87 are mounted into the carriage 80 from above, it is possible that ink is supplied from each cartridge to the printing head 90.

The control unit 30 is configured with a CPU 40, a ROM 42, and a RAM 60 that are connected to each other through a bus. A program stored in the ROM 42 is loaded into the RAM 60, and the CPU 40 executes the program and thus controls entire operation of the printer 20. The CPU 40 executes a control program and thus also functions as an input section 41, an image processing section 50 and a printing section 46. Among these, the input section 41 realizes a function of reading image data from a memory card MC mounted into the memory card slot 98 and reading an input for operation from the operation panel 99. Furthermore, the printing section 46 controls the printing head 90 described above or various motors and thus realizes a function of performing printing on the printing medium P.

The image processing section 50 includes multiple error diffusion units 501 to 50$n$ (hereinafter also referred to as ED1 to EDn units) that perform halftone processing in accordance with an error diffusion method. The multiple ED1 to EDn units 501 to 50$n$ are individually prepared as units that perform, in hardware, the halftone processing in accordance with the error diffusion method. Of course, the CPU 40 may be set to be of a multi-core type, and the halftone processing that is concurrently performed may be realized by being allocated to each core. It is possible that the ED1 to EDn units 501 to 50$n$ directly perform data exchanges through a shared memory 52. As the shared memory 52, an L2 cache or the like may be used in the CPU that is of the multi-core type. Operation of each of the ED1 to EDn units 501 to 50$n$ will be described below with reference to a flowchart in each of FIGS. 4 and 5.

In addition to the control program, an error diffusion matrix 43 or the like is stored in the ROM 42. The error diffusion matrix 43 is a collection of weighting coefficients used when an error, which occurs in an objective pixel, is diffused into pixels in the neighborhood of the objective pixel in the halftone processing in accordance with the error diffusion method that will be described below. An actual example of the error diffusion matrix 43 will be described in detail below.

The RAM 60 is used for the purpose of temporarily retaining data necessary for an arithmetic operation by the CPU 40 in addition to the control program described above. Examples of the data are as follows.

[1] Image data Dn of an original image that is halftone-processed

[2] Dot data for printing that is obtained as a result of the halftone processing

[3] Diffusion error data in which an error that is diffused into each pixel in the neighborhood of the objective pixel is stored Because [3] of these is necessary for each of the ED1 to EDn units 501 to 50n, a first error buffer 601 to an n-th error buffer 60n are prepared in the RAM 60.

The memory card slot 98 is connected to the control unit 30 and image data ORG can be read from the memory card MC inserted into the memory card slot 98 and be input into the control unit 30 through the input section 41. In the present embodiment, the image data ORG that is input from the memory card MC includes color components for three colors, red (R), green (G), and blue (B).

The printer 20 that has a hardware configuration as described above drives the carriage motor 70 and thus reciprocates the printing head 90 in a main scanning direction with respect to the printing medium P and drives the paper feeding motor 74, thereby moving the printing medium P in a sub-scanning direction. The control unit 30 drives a nozzle at a suitable timing based on print data, conforming to a movement (main scanning) in which the carriage 80 reciprocates and a paper-feeding movement (sub-scanning) of the printing medium, and thus forms an ink dot of suitable color at a suitable position on the printing medium P. By doing this, it is possible that the printer 20 prints a color image that is input from the memory card MC, on the printing medium P. The printer 20 according to the present embodiment employs a so-called serial printer configuration in which the printing head 90 reciprocates in a with direction of the printing medium P, more precisely, in the main scanning direction, but without being limited to the serial printer, a type of the printer 20 may, of course, be a line printer or a page printer in an applicable manner.

2. PRINTING PROCESSING AND IMAGE PROCESSING

Figure 2:
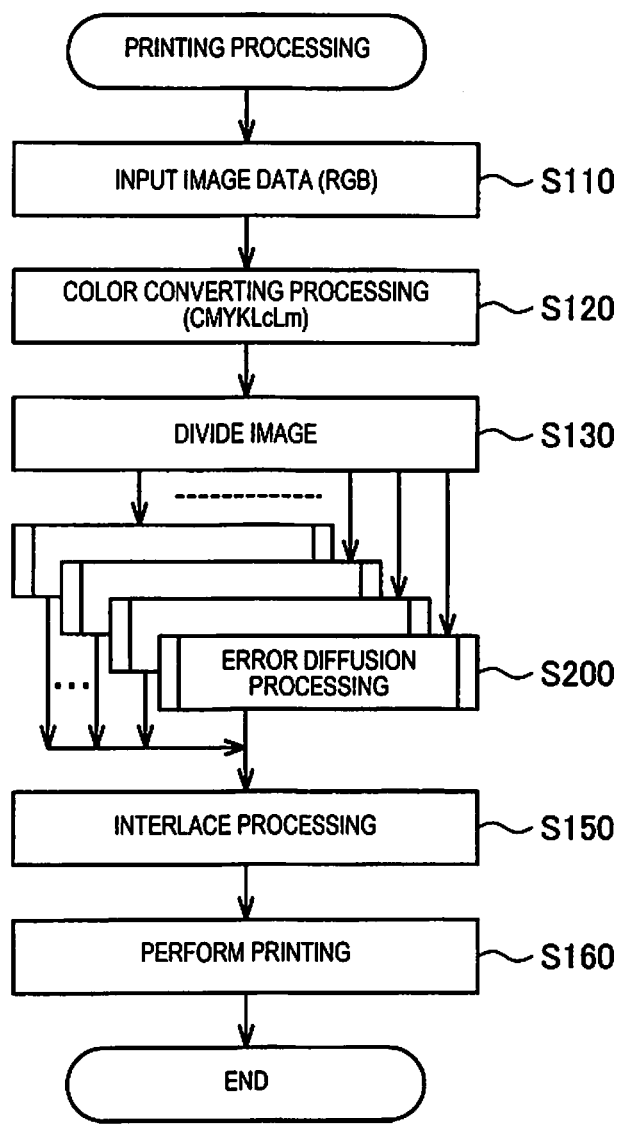
FIG. 2 is a flowchart illustrating a flow of printing processing in the printer.

Outlines of printing processing according to the embodiment and of image processing that is performed in the printing processing are described. FIG. 2 is a flowchart illustrating a flow for the printing processing in the printer 20. A user performs an operation of providing an instruction to print a prescribed image stored in the memory card MC, using the operation panel 99 or the like, and thus the printing processing here is started. When the printing processing is started, for inputting, the CPU 40 first reads the image data ORG in an RGB format, which is a printing target, from the memory card MC through the memory card slot 98, as processing by the input section 41 (Step S110).

When the image data ORG is input, referring to a look-up table (not illustrated) stored in the ROM 42, the CPU 40 color-converts the image data ORG from the RGB format to a CMYK LcLm format (Step S120). Color converting processing is well known, and thus a description thereof is omitted.

Figure 3:
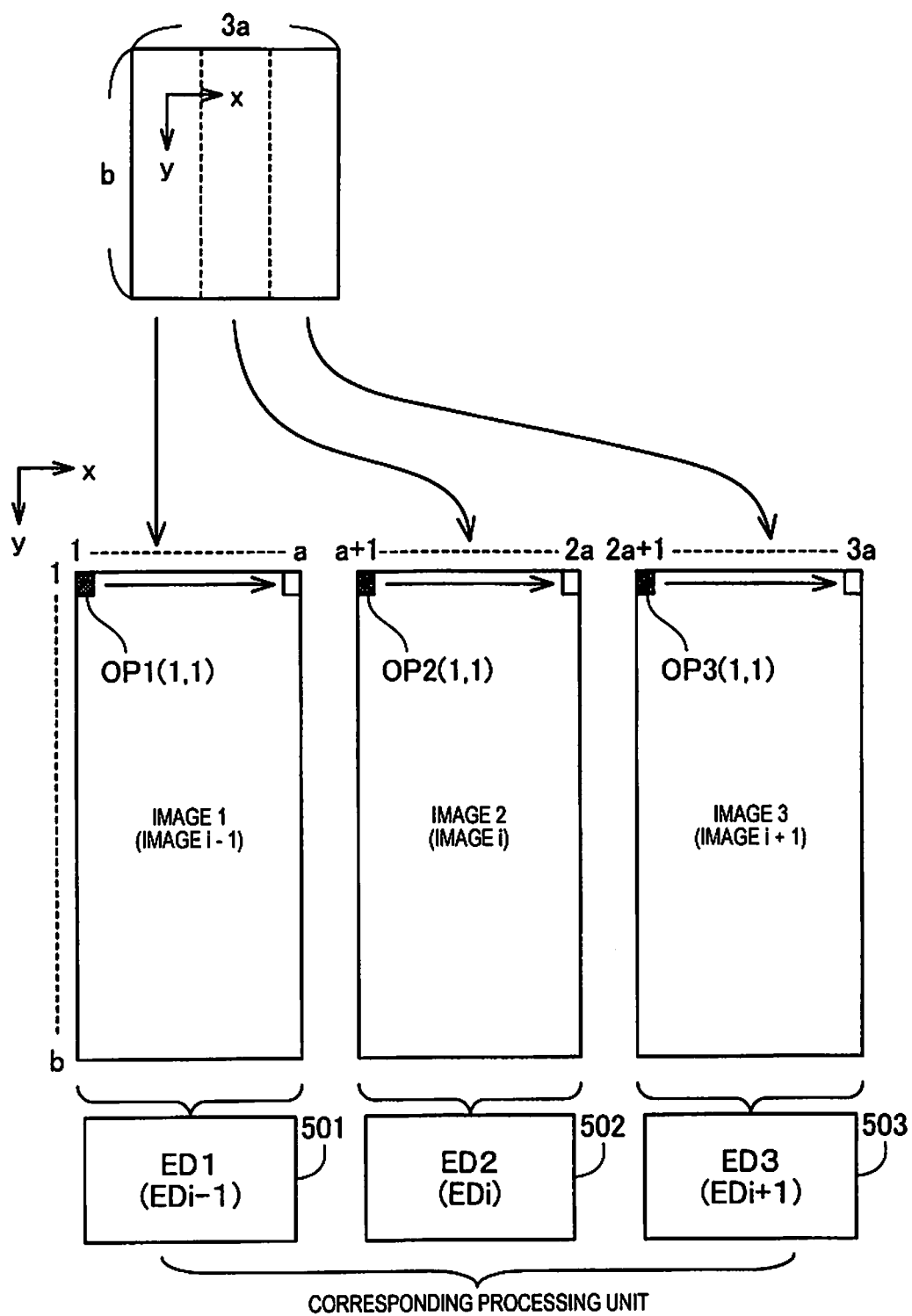
FIG. 3 is a descriptive diagram illustrating a relationship between a situation of division of an image and an ED unit.

Thereafter, processing that divides an image is performed (Step S130). In the present embodiment, as illustrated in FIG. 3, the image is divided into three areas in the main scanning direction. The number of areas obtained by the division, of course, may be 2 or greater. The division of the image is performed according to the number of ED units that are included in the image processing section 50, but although the number of areas obtained by the division is smaller than the number of ED units, this does not pose any problem. In the following description, in some cases, the images obtained by the division are referred to an image 1, an image 2, and an image 3, respectively. The image processing section 50 correspondingly uses three ED units, the ED1 to ED3 units 501 to 503 that are operable simultaneously. A suffix i is used to indicate how many ED units or images are present in the main scanning direction before each image or ED unit is present. Therefore, when no division image or unit is specified, in some cases, such a division image or an ED unit is expressed as an image i or an EDi unit 50i, respectively. Furthermore, in some cases, the image i or the EDi unit 50i is simply expressed such as an image i−1, an image i, or an image i+1, or such as an EDi−1, an EDi, and an EDi+1, and thus relationships among adjacent images or units are indicated. At this point, when the EDi−1 and the EDi are employed as two ED units, the EDi−1 is equivalent to "one error diffusion processing unit", and the EDi is equivalent to "other error diffusion processing unit". Furthermore, when the EDi and the EDi+1 are employed as two ED units, the EDi is equivalent to "one error diffusion processing unit", and the EDi+1 is equivalent to "other error diffusion processing unit".

For the convenience of description, in the embodiment, as illustrated in FIG. 3, it is assumed that an original image is configured with 3a pixels in the main scanning direction and b pixels in the sub-scanning direction. Anyone of a or b is an integer of 2 or more. Therefore, any one of the images 1, 2, and 3 is configured with (a×b) pixels in a row. It is possible that a pixel of the divided image i is specified by coordinates (x, y) with the main scanning direction as the x direction and the sub-scanning direction as the y direction. Values 1 to a for the image 1, values 1+a to 2a for the image 2, and values 2a+1 to 3a for the image 3 are within a range for x, but if attention is focused on each image i, because a pixels are all arranged in a line in the x direction, in the following description, 1 to a coordinates are designated in the x direction for the pixels that are to be processed by the EDi unit 50i. For the y direction, 1 to b coordinates are designated. Therefore, in each image i, coordinates, such as OPi (1, 1), are designated for any of pixels OP1 to OP3 on the upper left side from which processing is started. It is noted that, regardless of whether or not specification as the objective pixel is provided, in some cases, a pixel that is a target for the halftone processing is described as a pixel OP and any other pixel is described simply as a pixel (x, y), using coordinates. According to the division of the image, each EDi processes a pixels in the main scanning direction starting from the pixel OP (1, 1) as the starting point, and processes b pixels (raster) in the sub-scanning direction. The error diffusion processing that will be described below is performed in a direction of increasing an x coordinate gradually along the raster. In some cases, this direction is hereinafter referred to as the main scanning direction or a forward direction. Furthermore, in some cases; a direction opposite to the forward direction is hereinafter referred to an opposite direction.

After performing the division of the image (Step S130), as processing by the image processing section 50, the CPU 40 activates the EDi unit 50i for each divided image i, and performs error diffusion processing that converts image data into dot data in which ON and OFF states of a dot for each color is determined for every pixel using an error diffusion method (Step S200). The error diffusion processing here will be described in detail below. It is noted that in the present specification, the "error diffusion processing" is not limited to the processing that binarizes the ON and OFF state of the dot and is also possibly realized as general gradation conversion (reduction) processing that includes processing for multi-valuing to three or more gradation values, such as ON and OFF states of large and small dots, large, middle, and small dots, and the like. Furthermore, the image processing, such as resolution conversion processing or smoothing processing may be performed on the image data available in Step S200.

When performing the error diffusion processing (Step S200) on each divided image, the CPU 40 combines dot data generated for images obtained by the division, sets the generated dot data to be dot data that corresponds to the original image, and then performs interlace processing (Step S150) that rearranges the resulting dot data. This is because conformance to an arrangement of nozzles of the printer 20, an amount of paper feeding, or the like is not necessarily consistent with a line of dot data on a per-raster basis. After rearranging dot pattern data that are printed with the printing head 90 on a basis of one-time main scanning, as processing by the printing section 46, the CPU 40 drives the printing head 90, the carriage motor 70, the paper feeding motor 74, and the like, and thus performs formation of each color ink dot on the printing medium P, more precisely, performs the printing (Step S160).

3. HALFTONE PROCESSING

The error diffusion processing (Step S200) that is performed by each EDi unit 50$i$ is described in detail with reference to FIG. 4 and subsequent drawings. The error diffusion processing is performed for every divided image, more precisely, concurrently. In each EDi unit 50$i$, as illustrated in FIG. 3, processing is sequentially performed with the pixel OPi on the upper left side of the divided image as a starting point and with a coordinate in the main scanning direction as x and a coordinate in the sub-scanning direction as y. However, as will be described below, a starting timing for each EDi unit 50$i$ may not be the same. In the first embodiment, the EDI unit 501 (hereinafter simply referred to as an ED1) ends processing of all pixels (x=1 to a) for the first one raster (y=1), concurrently with beginning of processing of the next one raster (y=2), an adjacent ED2 unit 502 (hereinafter also simply referred to as an ED2) starts processing of the first one laster (y=1), the ED2 ends processing of all pixels (x=a+1 to 2a) for the first one raster (y=1), concurrently with beginning of processing the next raster (y=2), and then, an adjacent ED3 unit 503 (hereinafter also simply referred to as an Ed3) starts processing of the first one raster (y=1).

In the following description, in one in any order, of the rasters in the sub-scanning direction y, when it is said that processing is performed on one in any order, as the objective pixel, of the pixels in the main scanning direction x, the one pixel is expressed as the objective pixel OP (x, y). Therefore, a pixel adjacent to the objective pixel OP (x, y) in the main scanning direction in the same raster is expressed as a pixel OP (x+1, y), and a pixel adjacent in the sub-scanning direction is expressed as a pixel OP (x, y+1). Furthermore, when the order of rasters does not matter, a reference as an N-th raster is also made. A raster adjacent to the N-th raster in the sub-scanning direction is also referred to as an (N+1)-th raster.

Figure 4:
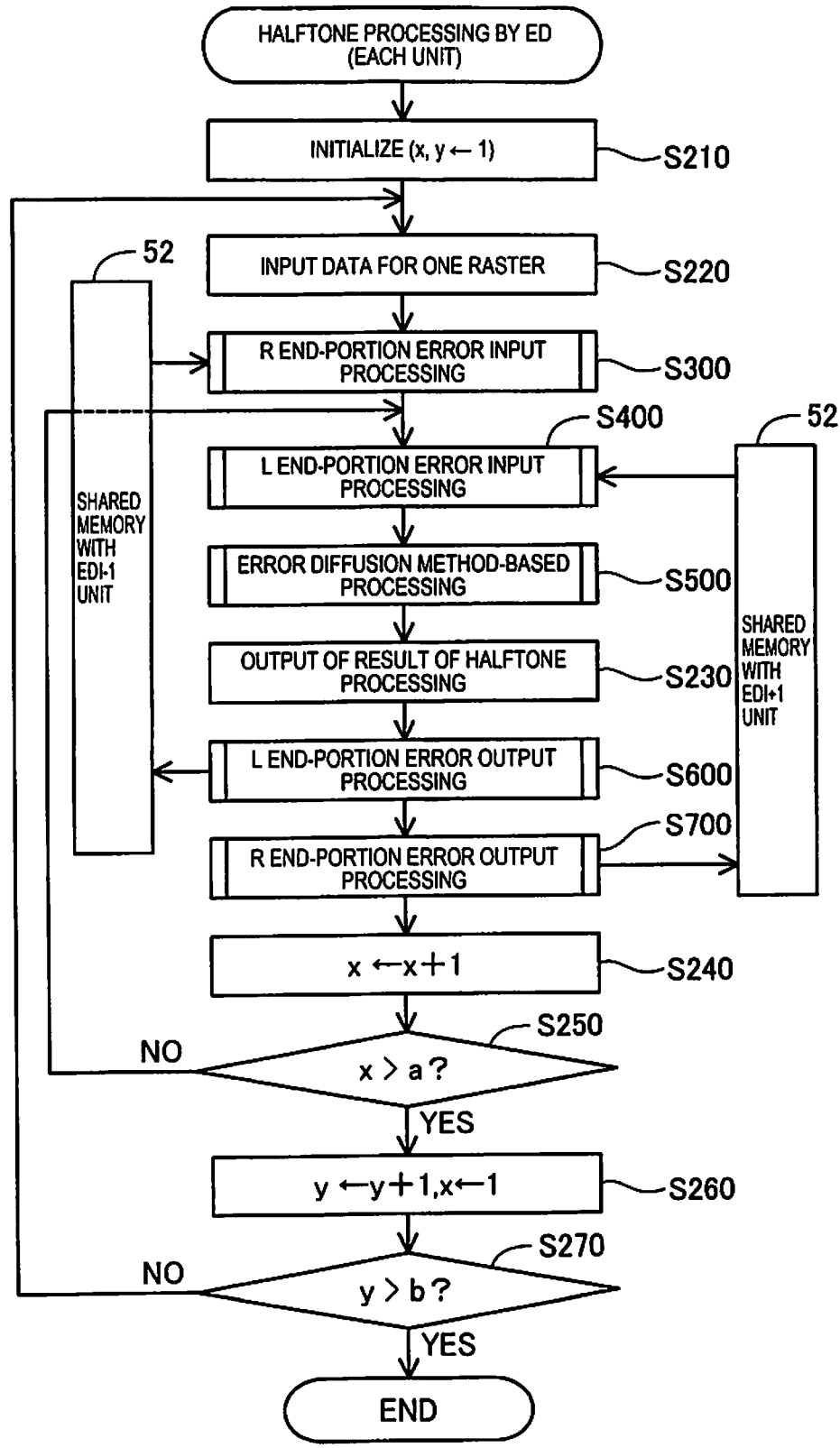
FIG. 4 is a flowchart illustrating halftone processing that is performed by one ED unit.
Figure 5:
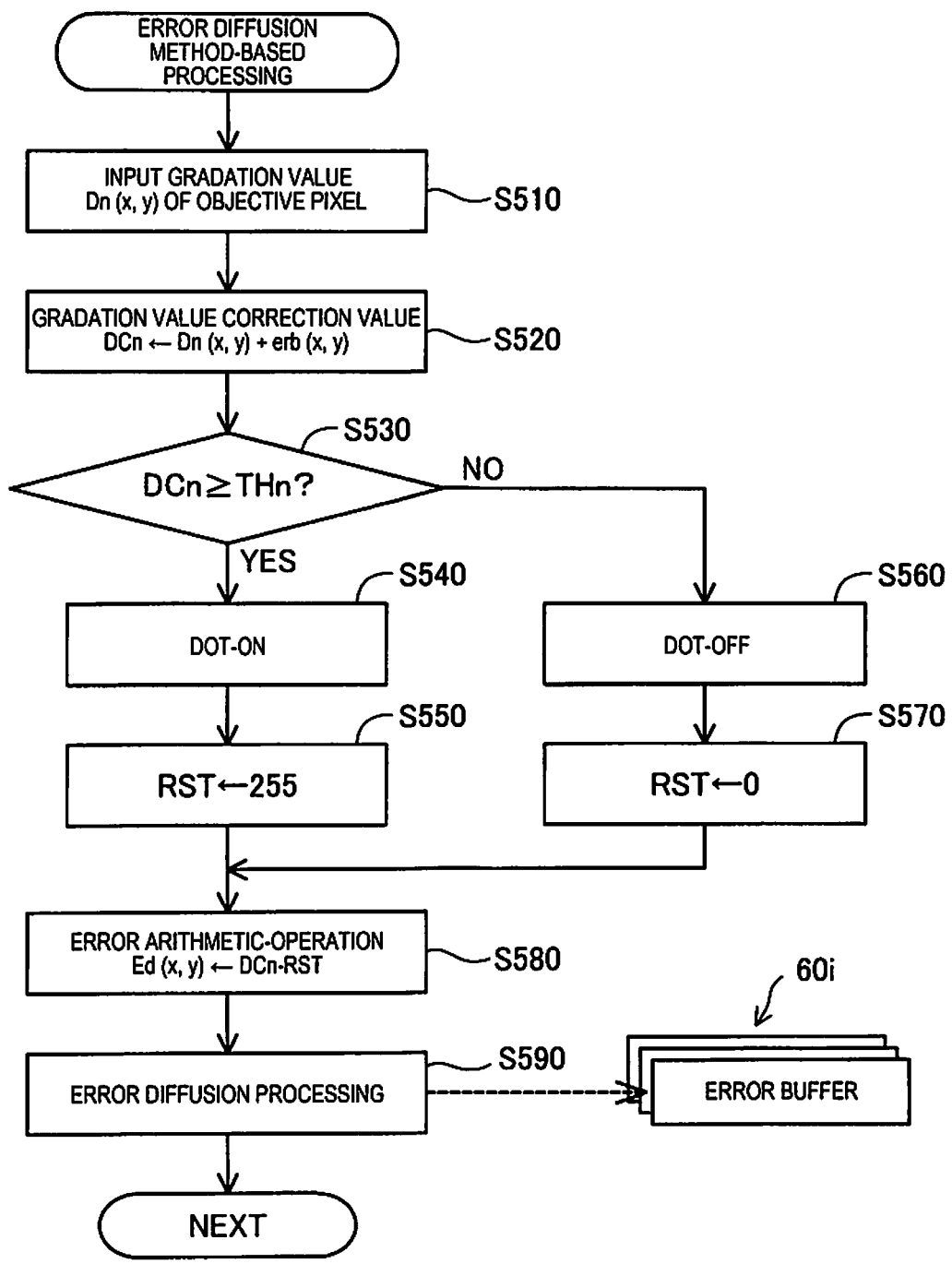
FIG. 5 is a flowchart illustrating an example of error diffusion method-based processing.

When each EDi (i=1 to 3) illustrated in FIG. 4 starts the halftone processing, first, variables x and y indicating a position of the objective pixel are both initialized to 1 (Step S210). Next, processing is performed that inputs image data for one raster from a corresponding division image i through the input section 41 (Step S220). At this point, the image data for one raster is data for one raster that corresponds to each division image i, and, for each EDi, is data indicating a gradation value of each color of a pixel x=1 to a. This is referred to as a gradation value Dn (x, y) of the objective pixel. It is noted that, when the gradation value is handled without a relationship to a position, in some cases, a reference as the gradation value Dn is simply made. Each EDi stores the image data for one raster, which is read, in a prescribed area of the RAM 60.

Next, each EDi sequentially performs R end-portion error input processing (Step S300) and L end-portion error input processing (Step S400). The R end-portion error input processing (Step S300) is processing in which an error that occurs as a result of each EDi performing processing in the vicinity of a right end (x=a) of the division image i, more precisely, in the neighborhood of the right end is received by the EDi+1 that is positioned to the right side of the EDi. The "right end" here refers to an end portion in the main scanning direction of the raster, of each division image i, on which the error diffusion processing is performed. The right end also refers to an "R end portion". On the other hand, the L end-portion error input processing (Step S400) is processing in which an error that occurs as a result of each EDi performing processing in the vicinity of a left end (x=0) of the division image i, more precisely, in the neighborhood of the left portion is received by the EDi−1 that is positioned to the left side of the EDi. The "left end" here refers to an end portion in the direction opposite to the main scanning direction of the raster, of each division image i, on which the error diffusion processing is performed. The left end also refers to an "L end portion". These processing operations are not performed when performing processing on all objective pixels OP (x, y), and are performed at prescribed timings. In addition to the timings, the processing operations will be described below.

Subsequently, the EDi performs error diffusion method-based processing (Step S500) and processing that outputs a halftone result which is obtained by the error diffusion method-based processing (Step S230). The error diffusion method-based processing (Step S500) is illustrated in detail in FIG. 5. When the error diffusion method-based processing is started, each EDi inputs the gradation value Dn (x, y) of the objective pixel, which is read in advance and is stored in the RAM 60 (Step S510). Next, processing is performed that adds a diffusion error erb (x, y) to the gradation value Dn (x, y) of the objective pixel and obtains a gradation value correction value DCn (Step S520). The diffusion error erb (x. y) results from sequentially accumulating error that is diffused from the pixel in the vicinity, the error diffusion method-based processing on which is completed to the objective pixel OP (x, y) and storing the error. The diffusion error erb (x, y) is stored in an error buffer 60$i$. The diffusion error erb (x, y) will also be described below.

The gradation value correction value DCn is obtained and then the gradation value correction value DCn and a threshold THn are compared to each other (Step S530). At this point, if the gradation value Dn of the objective pixel is in a range of values from 0 to 255, the threshold THn can use a median value of 128 thereof. It is noted that although the threshold THn is obtained using a function of the image data Dn, this does not pose any problem.

If, as a result of comparing the gradation value correction value DCn with the threshold THn, the gradation value correction value DCn is at or above the threshold THn, in order to form a dot on the objective pixel, the halftone result is set to be "dot-ON" (Step S540), and a value of 255 is set for a result value RST (Step S550). On the other hand, if a result of comparing the gradation value correction value DCn with the threshold THn, if the gradation value correction value DCn is less than the threshold THn, in order not to form a dot on the objective pixel, the halftone result is set to be "dot-OFF" (Step S560), and a value of 0 is set for the result value RST (Step S570). Thereafter, an error arithmetic-operation is performed (Step S580). The error arithmetic-operation is an arithmetic operation in which a gradation error Ed (x, y) is obtained as a difference between the gradation value correction value DCn and the result value RST. Thereafter, the error diffusion processing (Step S590) for diffusing the obtained gradation error Ed (x, y) into the pixels in the neighborhood of the objective pixel is performed.

Figure 6:
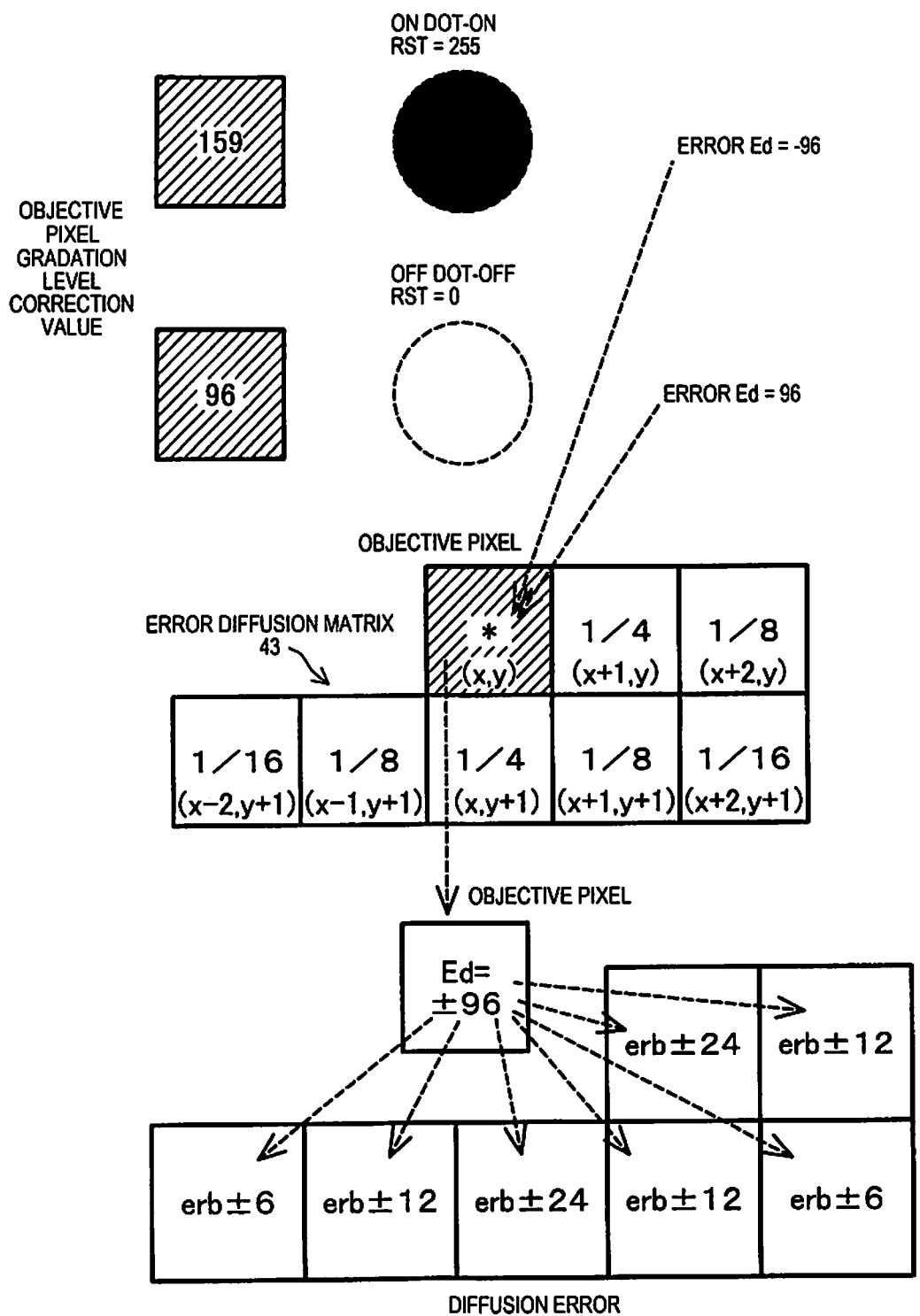
FIG. 6 is a descriptive diagram illustrating a situation where a gradation error is diffused into a neighboring pixel, with a weighting that is determined in an error diffusion matrix, in the error diffusion method-based processing.

An example of the error diffusion method-based processing is illustrated in FIG. 6. In FIG. 6, cases where gradation correction values of the objective pixel are 159 and 96 are illustrated. At this time, when, as a result of the comparison with the threshold THn of 128 (Step S530), the ON and OFF states of the dot are determined, it is determined that, for a pixel with the gradation correction value of 159, a dot is formed (Step S540), and the value of 255 is set for the result value RST (Step S550). The reason of setting the result value RST to the value of 255 is that, when a dot is formed, a gradation value of the position on the printing medium P, which corresponds to the pixel, is assumed to be the maximum (255). In the same manner, for a pixel with a gradation correction value of 96, it is determined that a dot is not formed (Step S560), and a value of 0 is set for the result value RST (Step S570). The reason of setting the result value RST to the value of 0 is that, when a dot is not formed, the gradation value of the position on the printing medium P, which corresponds to the pixel, is assumed to be the minimum (0) corresponding to a paper color of the printing medium P, that is, generally, a white color. The result value RST is suitably set according to a size of a dot that is actually formed, a concentration of ink, or the like.

In the condition described above, when the gradation error Ed (x, y) is obtained, when a dot is formed, Ed (x, y)=159−255=−96 is obtained, and when a dot is not formed, Ed (x, y)=96−0=96 (Step S580) is obtained. Thus, the gradation error Ed (x, y) is diffused into the pixels in the neighborhood of the objective pixel (Step S590). The diffusion into the neighboring pixel is performed according to the weighting coefficient stored in the error diffusion matrix 43 illustrated in FIG. 6. In an example illustrated in FIG. 6, the weighting coefficient is stipulated for seven pixels in the neighborhood of the objective pixel*. The weighting coefficient in a pixel (x+1, y) and a pixel (x, y+1) is ¼ of the objective pixel OP (x, y). The weighting coefficient in a pixel (x+2, y), a pixel (x+1, y+1), and a pixel (x−1, y+1) is ⅛ thereof. The weighting coefficient in a pixel (x+2, y+1) and a pixel (x−2, y+1) is 1/16 thereof. Therefore, when the gradation error Ed is ±96, as illustrated, the error that is diffused into each pixel is ±24 if the weighting coefficient is ¼, is ±12 if the weighting coefficient is ⅛, and is ±6 if the weighting coefficient is 1/16. These values are added as the diffusion error erb into each pixel for being stored into an i-th error buffer 60i prepared in the RAM 60. Specifically, the diffusion error erb that is obtained according to Equation (1) that follows is stored in an error buffer that is prepared in the RAM 60.

$$erb(x+1,y)=erb(x+1,y)+Ed\times(1/4)$$

$$erb(x+2,y)=erb(x+2,y)+Ed\times(1/8)$$

$$erb(x-2,y+1)=erb(x-2,y+1)+Ed\times(1/16)$$

$$erb(x-1,y+1)=erb(x-1,y+1)+Ed\times(1/8)$$

$$erb(x,y+1)=erb(x,y+1)+Ed\times(1/4)$$

$$erb(x+1,y+1)=erb(x+1,y+1)+Ed\times(1/8)$$

$$erb(x+2,y+1)=erb(x+2,y+1)+Ed\times(1/16) \quad (1)$$

As understood from Equation (1), in the present embodiment, the gradation error Ed is diffused into a raster y that is the same as one in which the objective pixel OP (x, y) is present and a raster y+1 that is by one row lower than the raster y. For this reason, if a size of the i-th error buffer 60i prepared for each EDi is such that diffusion errors for two rasters are stored, this is sufficient. An area where the diffusion error erb (x, y) that is accumulated in each pixel in the same raster y as the objective pixel is stored is referred to as a first area error buffer, and an area where a diffusion error erb (x, y+1) that is accumulated in each pixel in a raster y+1 which is a raster next to that in which the objective pixel is present is stored is referred to as a second area error buffer. If processing of one raster is finished, because contents of the first area error buffer are all exhausted, a second area error buffer erb is set to be the first area error buffer, and the entire first area error buffer is reset to a value of 0, and then is substituted for the second area error butter erb. This processing is referred to as update processing of the error buffer.

When diffusion of the gradation error Ed in an end portion of each raster according to Equation (1) described above is performed, an error diffusion range exceeds a range from a pixel OP (1, y) in the main scanning direction to the OP (a, y). This range differs depending on a size of the error diffusion matrix 43. However, in the case of an error diffusion matrix illustrated in FIG. 6, the range corresponds to four pixels in a right end of the raster and corresponds to two pixels in a left end of the raster. Because an x coordinate of the pixel that is processed in the main scanning direction in one division image ranges from 1 to a, in a range of surplus necessary in the right end of the raster, diffusion errors that are stored in the first area error buffer and diffusion errors that are stored in the second area error buffer, which are diffusion errors from a pixel in an N-th raster, are expressed as diffusion errors erb (a+1, y) and erb (a+2, y), and as diffusion errors erb (a+1, y+1) and erb (a+2, y+1), respectively. On the other hand, in the range of surplus necessary in the left end of the raster, diffusion errors that are stored in the second area error buffer, which are the diffusion errors from the pixel in the N-th raster are expressed as diffusion errors erb (−2, y+1) and erb (−1, y+1). In the left end of the raster, because an error that is diffused into the same raster leftward from the objective pixel is not present, there is no need to secure the range of surplus in the first area error buffer. Handling of the diffusion error in this range will be described in detail below.

The objective pixel moves, and thus, in an example of the error diffusion matrix illustrated in FIG. 6, addition and subtraction of the diffusion error into a storage area within the error butter, which corresponds to a specific pixel are performed 7 times in total for each objective pixel with an initial value as 0, and a final value is determined.

The error diffusion method-based processing (Step S500) is performed, and then, the ON and OFF states of the dot that are determined by the comparison with the threshold THn are output as a result of the halftone processing (Step S230 in FIG. 4). The result of the halftone processing is stored in a prescribed area in the RAM 60.

Thereafter, an L end-portion error output processing (Step S600) and an R end-portion error output processing (Step S700) are performed. The L end-portion error output processing (Step S600) and the R end-portion error output processing (Step S700) are processing operations that presuppose the L end-portion error input processing (Step S400) and the R end-portion error input processing (Step S300), respectively. Thus, these processing operations will be described collectively below along with the R end-portion error input processing (Step S300) and the L end-portion error input processing (Step S400).

Thereafter, a coordinate x in the main scanning direction, of the objective pixel is incremented by a value of 1(Step S240), and it is determined whether or not the coordinate x is greater than a value of a, more precisely, whether or not the error diffusion processing on one raster is performed on up to the right end (Step S250). If the coordinate x in the main scanning direction does not exceed the value of a, it is determined that the processing of one raster is not completed, returning to Step S400 takes place, and the processing operations (Steps S400 to S250) described above are repeated until an end portion (a right end) in the main scanning direction, of the objective pixel is reached.

If it is determined that the right end of the objective pixel is reached (YES in Step S250), each EDi not only initializes the coordinate x to the value of 1, but also increments a coordinate yin the sub-scanning direction by the value of 1 (Step S260). Each EDi determines whether or not the coordinate y is greater than a value of b, more precisely, whether or not the error diffusion processing on one division image is performed on up to the last raster (Step S270). If the coordinate y in the sub-scanning direction does not exceed the value of b, it is determined that the processing of one division image is not completed, returning to Step S220 takes place, and the processing operations (Steps S220 to S270) described above are repeated starting from input of the image data for one raster, until the processing is performed on up to a lower end of the division image. If the processing is performed on up to the lower end of the division image (YES in Step S270), proceeding to END takes place, and the halftone processing by the ED is ended.

4. ERROR EXCHANGE BETWEEN THE ED UNITS

Next, error delivery between each of the ED units, which is performed in the halftone processing (FIG. 4) by the Ed described above will be described. Two types of error deliveries between each of the ED units are as follows. One is for delivering the diffusion error that is based on the gradation error which occurs in a right end of the EDi−1, to the EDi adjacent in the main scanning direction. The error delivery in this case is realized by outputting the error to the shared memory 52 in the R end-portion error output processing (Step S700) by the EDi−1 and inputting the error in the R end-portion error input processing (Step S300) by the EDi.

The other one is for delivering the diffusion error that is based on the gradation error which occurs in a left end of the EDi, to the EDi−1 adjacent in the direction opposite to the main scanning direction. The error delivery in this case is realized by outputting the error to the shared memory 52 in the L end-portion error output processing (Step S600) by the EDi and inputting the error in the L end-portion error input processing (Step S400) by the EDi−1.

Figure 7:
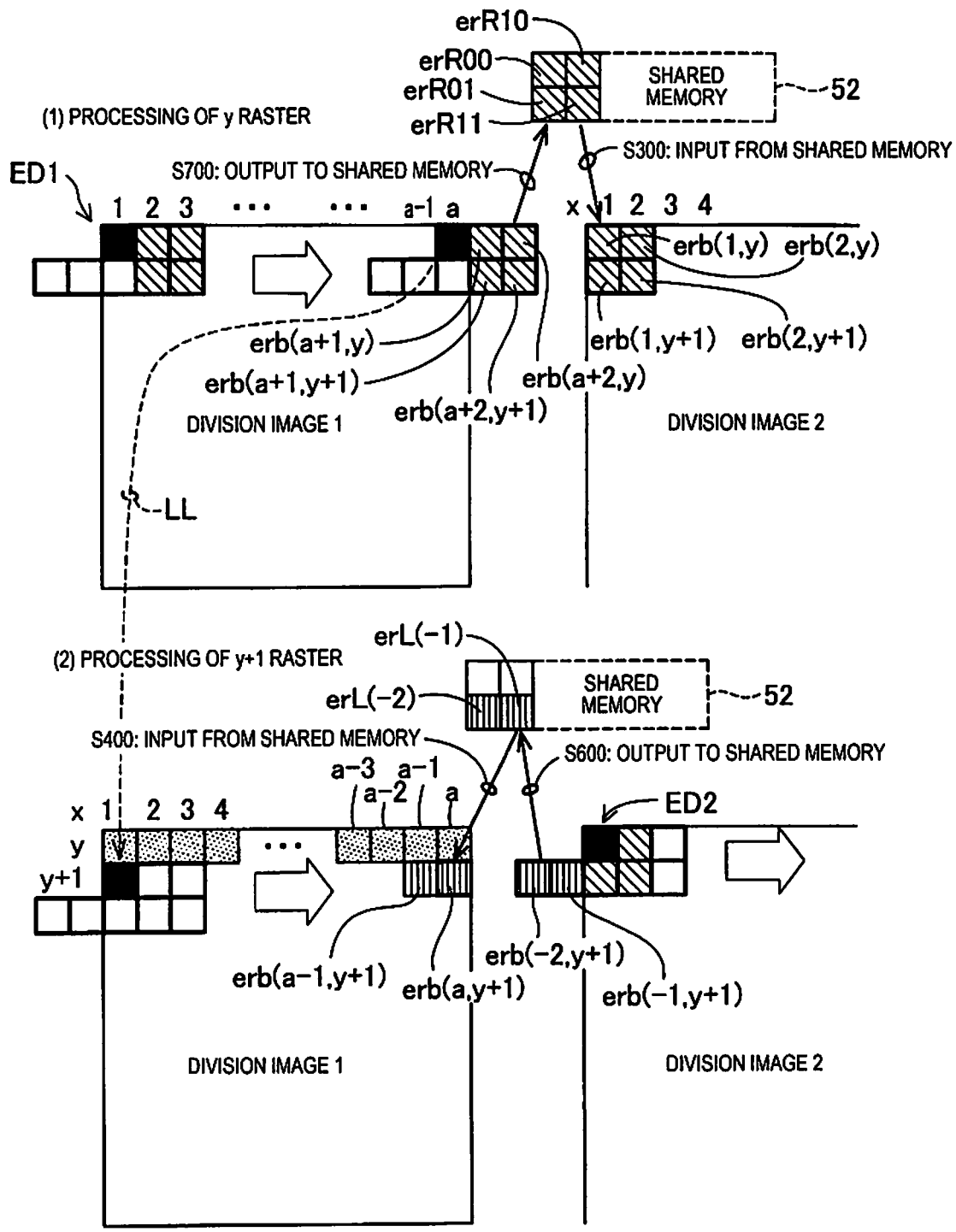
FIG. 7 is a descriptive diagram illustrating an outline of processing that delivers a diffusion error which occurs among division images.

Outlines of the error deliveries are described with reference to FIG. 7. In FIG. 7, a case is illustrated where an error is delivered between the ED1 that performs the error diffusion processing of the division image 1 and the ED2 that performs the error diffusion processing of the division image 2. A case is considered where the ED1 that performs the error diffusion processing performs the error diffusion method-based processing (Step S500) on up to the right end (a, y) while moving one objective pixel at a time in the raster with the coordinate y in the main scanning direction. When the objective pixel reaches the right end of the division image, the pixel on which the dot data has to be formed is not present in the main scanning direction from the right end (a, y), but in the error diffusion method-based processing (Step S500), the gradation error Ed is diffused into the neighborhood of the objective pixel OP (a, y) using the weighting stipulated by the error diffusion matrix (refer to FIG. 6). In the right end of the division image, an error is diffused in a range that corresponds to four pixels in the main scanning direction from the objective pixel OP (a, y).

The diffusion error that has to be diffused rightward in the main scanning direction of the objective pixel OP (a, y) is not referred to in the division image 1, but as described above, is retained, as the diffusion errors erb (a+1, y), erb (a+2, y), erb (a+1, y+1), and erb (a+2, y+1), in extended areas in the first and second area error buffers, which is the range that corresponds to the four pixels. Of course, the diffusion error into an area other than an area of the division image 1 also occurs in the case of the objective pixels OP (a−1, y−1), (a, y−1), and (a−1, y), and because of this, the diffusion errors erb (a+1, y), erb (a+2, y), erb (a+1, y+1), and erb (a+2, y+1) that are stored in the first area error buffer result from accumulating these. If the objective pixel reaches up to a right end (a, y) of a y raster, the diffusion errors erb (x+1, y), erb (a+2, y), erb (a+1, y+1), and erb (a+2, y+1) are determined as errors that are diffused from the y raster.

The determined diffusion errors that are retained in these ranges are transferred to the adjacent ED2 through the shared memory 52. Areas in the shared memory 52, in which the diffusion errors in these ranges are retained, are referred to as shared buffers erR00, erR01, erR10, and erR11, respectively. In FIG. 7, this area is hatched with rightward-inclined lines. Processing that outputs the diffusion error at the right end in the main scanning direction, of the y raster, to the shared buffers erR00, erR01, erR10, and erR11 of the shared memory 52 is equivalent to the R end-portion error output processing (Step S700). In the present embodiment, as described below, the diffusion errors erb (a+1, y) and erb (a+1, y+1) that are obtained at a point in time at which the objective pixel reaches a pixel OP (a−1, y) that precedes a pixel at the right end of the y raster by one pixel are output to the shared buffer of the shared memory 52, the diffusion errors erb (a+1, y), erb (a+2, y), erb (a+1, y+1), and erb (a+2, y+1) that are obtained at a point in time at which the objective pixel reaches the pixel OP (a, y) at the right end of the y raster are further output to the error buffer of the shared memory 52, and the diffusion error that is diffused from the y raster is determined by performing addition processing in the error buffer. Of course, the diffusion error may be stored in a temporary buffer until the objective pixel reaches the right end (a, y) of the y raster, all the diffusion errors may be determined until the objective pixel reaches the right end (a, y) of the y raster, and then the R end-portion error output processing may be performed all at once.

In this way, originally, the diffusion error that is output by the ED1 to the shared buffer erR00, erR01, erR10, and erR11 of the shared memory 52 has to be referred to in the error diffusion method-based processing in the objective pixels OP (1, y), (2, y), (1, y+1), (2, y+1) of the division image 2. Thus, in the ED2, a value in the shared buffer erR00 of the shared memory 52 is set as a diffusion error erb (1, y), a value in the shared buffer erR10 is set as a diffusion error erb (2, y), a value in the shared buffer erR01 is set as a diffusion error erb (1, y+1), and a value in the shared buffer erR11 is set as a diffusion error erb (2, y+1), and each of these is added to the error buffer 60*i* in the ED2. This processing is equivalent to the R end-portion error input processing (Step S300). It is possible that the R end-portion error input processing (Step S300) that the ED2 and the ED3 which process the division image 2 and the division image 3 perform on the N-th raster is performed after the R end-portion error output processing (Step S700) that is performed by the ED1 and the ED2 on the N-th raster in the division images 1 and 2 is completed.

Next, input and output of an L end-portion error will be described. When the error diffusion method-based processing (FIG. 5) is performed on the pixel OP (1, y) at the left end in the main scanning direction, of each of the division images 2 and 3, as illustrated in FIG. 6, the gradation error is also diffused in the direction opposite to the main scanning direction of the objective pixel OP (1, y). In the division image 1, although the gradation error is diffused an image corresponding thereto is not present, but in the division images 2 and 3, originally, the gradation error has to be diffused into a pixel in the right end of each of the adjacent division images 1 and 2. As described already, in the first area error buffer, an area is secured for storing the diffusion error that results when the gradation error that occurs by the error diffusion method-based processing in the pixel OP (1, y) at a left end of the division image is diffused, toward the direction opposite to the main scanning direction of the pixel OP (1, y) at the left end, more precisely, toward the outside of the division image. The diffusion errors that are stored in the first area error buffer are diffusion errors erb (−2, y) and erb (−1, y).

The diffusion errors erb (−2, y) and erb (−1, y) that are stored in the first area error buffer are transferred to the adjacent ED1 and ED2 through the shared memory 52. Areas in the shared memory 52, in which the diffusion errors in these ranges are retained, are referred to as shared buffers erL (−2) and erL(−1). In FIG. 7, the area is hatched with vertical lines. Processing that outputs the diffusion error at the left end in the main scanning direction, of the y raster, to the shared buffers erL(−2) and erL(−1) of the shared memory 52 is equivalent to the L end-portion error output processing (Step S600). In a case where the objective pixel is present at a left end (1, y) of the y raster, the diffusion error erb (−2, y) of the diffusion errors (−2, y) and erb (−1, y) that are stored in the first area error buffer is determined, but the diffusion error erb (−1, y) is not yet determined. The objective pixel moves to a pixel OP (2, y) from the left end (1, y) of the y raster adjacent thereto, and, at a point in time at which the processing that diffuses the error is ended, the diffusion error erb (−1, y) is determined. More precisely, a point in time at which the error diffusion method-based processing of the pixel OP (1, y) is ended, the diffusion error erb (−2, y) is determined, and a point in time at which the error diffusion method-based processing of the pixel OP (2, y) is ended, the diffusion error erb (−1, y) is determined. Thus, in the present embodiment, when the objective pixel is present at the left end (1, y), the diffusion error erb (−1, y), along with the determined diffusion error erb (−2, y), is output to the shared buffer, and, when the objective pixel advances toward the adjacent pixel OP (2, y), it is assumed that, the diffusion error erb (−1, y) is added for being writing into the shared buffer. Of course, although the diffusion error erb (−1, y) stored in the first area error buffer is temporarily written into a temporary buffer, and after a value is determined, the L end-portion error output processing (Step S600) is performed in such a manner that the value is written in the shared buffer erL (−1), this does not pose any problem.

In this way, the diffusion error that is output by the ED2 to the shared buffers erL (−2) and erL (−1) of the shared memory 52, as illustrated in FIG. 7, has to be referred to in the error diffusion method-based processing in objective pixels OP (a−1, y+1) and (a, y+1) of the division image 1. Thus, in the ED1, the diffusion error is input, as the diffusion errors erb (a−1, y+1) and erb (a, y+1), from the shared memory 52 into the second area error buffer. The processing is equivalent to the L end-portion error input processing (Step S400). With the error diffusion method-based processing that is performed by the ED2 and ED3 on the objective pixel in the N-th raster, in the division images 2 and 3, the L end-portion error output processing (Step S600) on the pixel in the (N+1)-th raster may be completed until the ED1 and the ED2 that process the division images 1 and 2, respectively, perform the L end-portion error input processing (Step S400) that is performed on the (N+1)-th raster. In other words, it is possible that the L end-portion error input processing (Step S400) of the division images 1 and 2 by the ED1 and the ED2, respectively are performed after the L end-portion error output processing (Step S600) of the division images 2 and 3 by the ED2 and the ED3, respectively, is completed.

Figure 8:
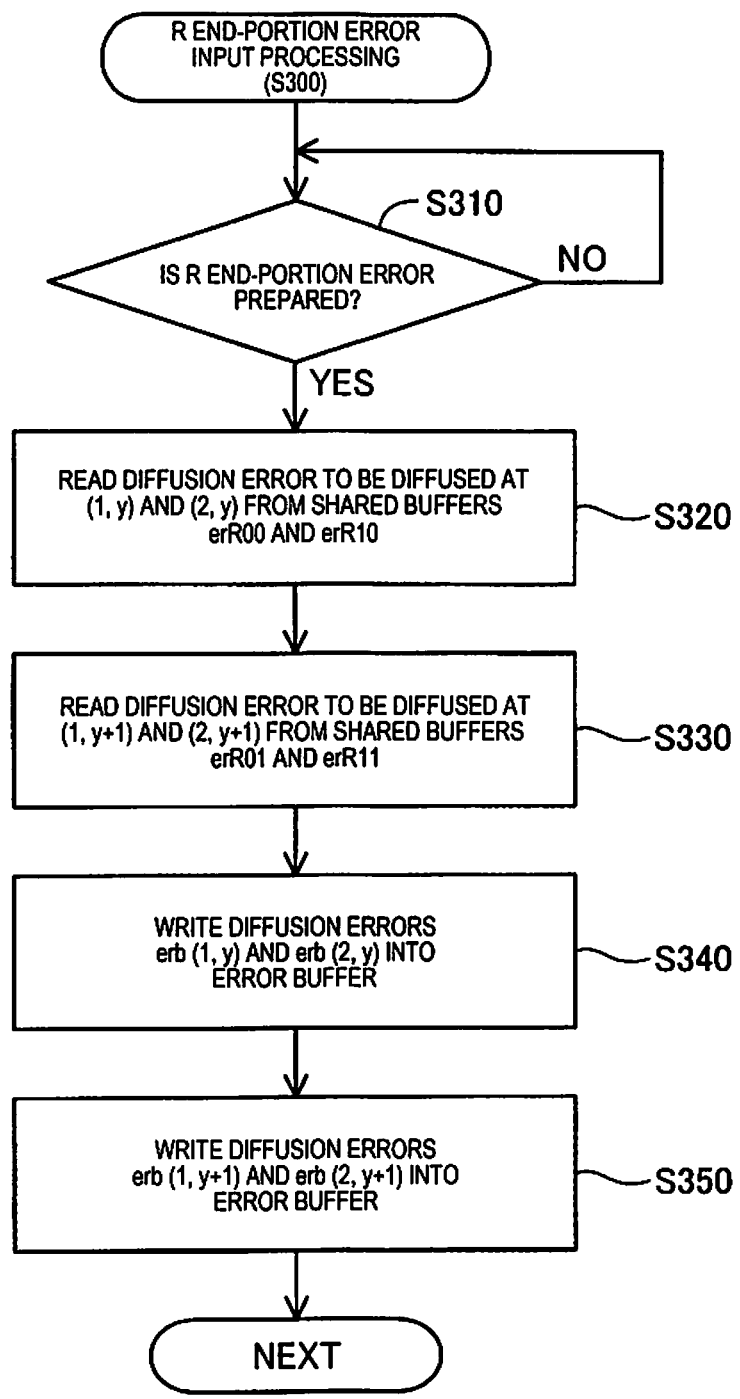
FIG. 8 is a flowchart illustrating a detail of R end-portion error input processing (Step S300).
Figure 9:
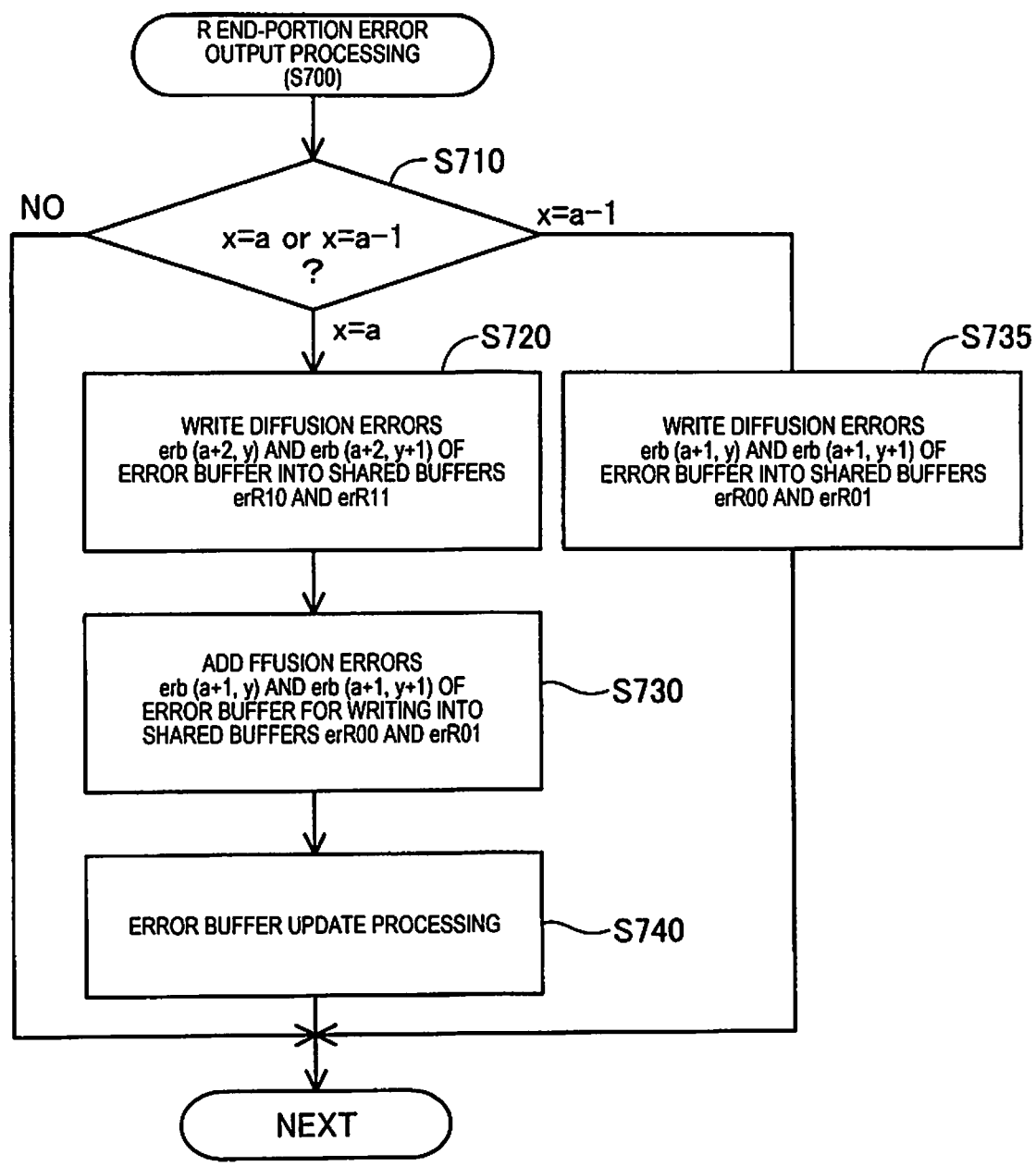
FIG. 9 is a flowchart illustrating the detail of R end-portion error output processing (Step S700).

Among these end-portion processing operations, first, the R end-portion error input processing (Step S300) and the R end-portion error output processing (Step S700) are described in detail with reference to FIGS. 8 to 10. FIG. 8 is a flowchart illustrating in detail the R end-portion error input processing (Step S300), and FIG. 9 is a flowchart illustrating in detail the R end-portion error output processing (Step S700). In the halftone processing illustrated in FIG. 4, the R end-portion error input processing (Step S300) is performed prior to performing the error diffusion method-based processing (Step S500). When the processing illustrated in FIG. 8 is started, the EDi first determines whether or not an R end-portion error that is equivalent to a forward-direction diffusion error is prepared for the shared buffers erR00, erR01, erR10, and erR11 of the shared memory 52 (Step S310). In the ED1 that processes the division image 1, because the division image adjacent in the direction opposite to the main scanning direction of the ED1 is not present, the R end-portion error input processing (Step S300) is not performed by the ED1. Therefore, the ED1 immediately performs Steps S400 and subsequent steps for the halftone processing, which are illustrated in FIG. 4.

In contrast with this, in the ED2 and ED3 that process the division images 2 and 3, respectively, first, the adjacent ED1 and ED2 determine whether or not the adjacent ED1 and ED2 write the R end-portion error into the shared buffers erR00, erR01, erR10, and erR11 of the shared memory 52. This determination is for preparing a flag indicating the completion of the writing of the R end-portion error into the shared memory 52. When the EDi at an earlier stage completes the R end-portion error output processing (Step S700) that will be described below, if the flag is set, the Edi+1 at a later stage can easily determine the completion of writing of the R end-portion error using the flag. The completion of the writing of the L end-portion error can also be performed in the same manner. The ED2 and the ED3 that process the division images 2 and 3, respectively, repeat the determination in Step S310 and waits until the ED1 and the ED2 at the earlier stage prepare the R end-portion error in the shared buffers erR00, erR01, erR10, and erR11 of the shared memory 52.

The ED1 repeats processing operations in Step S400 and subsequent steps, while the ED2 and the ED3 repeat the determination in Step S310. Specifically, while the objective pixel advances toward the main scanning direction, the error diffusion method-based processing (Step S500), output of a result of the halftone processing (Step S230), the L end-portion error output processing (Step S600) and the R end-portion error output processing (Step S700) subsequent to this are performed. The R end-portion error output processing is illustrated in detail in FIG. 9. In the R end-portion error output processing (Step S700), first, the EDi makes a determination of whether the x coordinate in the main scanning direction is a−1 or a (Step S710). If the x coordinate is not a−1 or a, the objective pixel is not yet at a position where output processing of the R end-portion error is performed. Thus, the processing proceeds to "NEXT" without doing anything, and temporarily ends the R end-portion error output processing (Step S700).

In the determination in Step S710, if the x coordinate is a−1, processing is performed that writes the diffusion error erb (a+1, y) stored in the first area error buffer and the diffusion error erb (a+1, y+1) stored in the second area error buffer into the shared buffers erR00 and erR01 of the shared memory 52 (Step S735). This is because the objective pixel is the pixel OP (a−1, y) that precedes the right end by one pixel and thus according to a size of the error diffusion matrix illustrated in FIG. 6, the diffusion error that is transferred to the adjacent EDi is limited to the diffusion error erb (a+1, y) that is stored in the first area error buffer and to the diffusion error erb (a+1, y+1) that is stored in the second area error buffer. In a case where Step S735 is performed, proceeding to "NEXT" takes place and the present processing routine is temporarily ended.

Furthermore, if the x coordinate is equal to a, an objective pixel reaches the right end of the raster that is processed and thus the diffusion error erb (a+2, y) stored in the first area error buffer and the diffusion error erb (a+2, y+1) stored in the second area error buffer are written into the shared buffers erR10 and erR11 of the shared memory 52 (Step S720). The diffusion error erb (a+2, y) stored in the first area error buffer and the diffusion error erb (a+2, y+1) stored in the second area error buffer are determined as the diffusion errors that occur by processing the pixel at the right end of the raster y, and thus are handed over from the ED1 to the ED2. Subsequently, the diffusion error erb (a+1, y) stored in the first area error buffer and the diffusion error erb (a+1, y+1) stored in the second area error buffer are added for being writing into the shared buffers erR00 and erR01 of the shared memory 52 (Step S730). At this point, the writing into the shared buffer after addition means that when the diffusion error is already written into the corresponding shared buffer, a new diffusion error is added to this. Because, in some cases, a negative value of the diffusion error is present, addition and subtraction processing operations are actually performed. With the addition and subtraction processing operations, the diffusion error erb (a+1, y) stored in the first area error buffer and the diffusion error erb (a+1, y+1) stored in the second area error buffer are determined as the diffusion errors that are obtained by processing two pixels at the right end of the raster y, and thus are handed over from the ED1 to the ED2. It is noted that as the diffusion errors which are diffused from the neighboring pixel into the pixel in the raster y+1, the diffusion error from the pixel in the raster y and the diffusion error from the pixel in the raster y+1 are present, at this point in time diffusion errors erb (1, y+1) and erb (2, y+1) in the adjacent ED2 are not determined as the diffusion errors for obtaining the gradation correction value in the error diffusion method-based processing. The diffusion errors erb (1, y+1) and erb (2, y+1) are determined as the diffusion errors for obtaining the gradation level correction value, at a point in time at which the error diffusion method-based processing of the pixel in the raster y+1 in the ED1 is completed.

Figure 10:
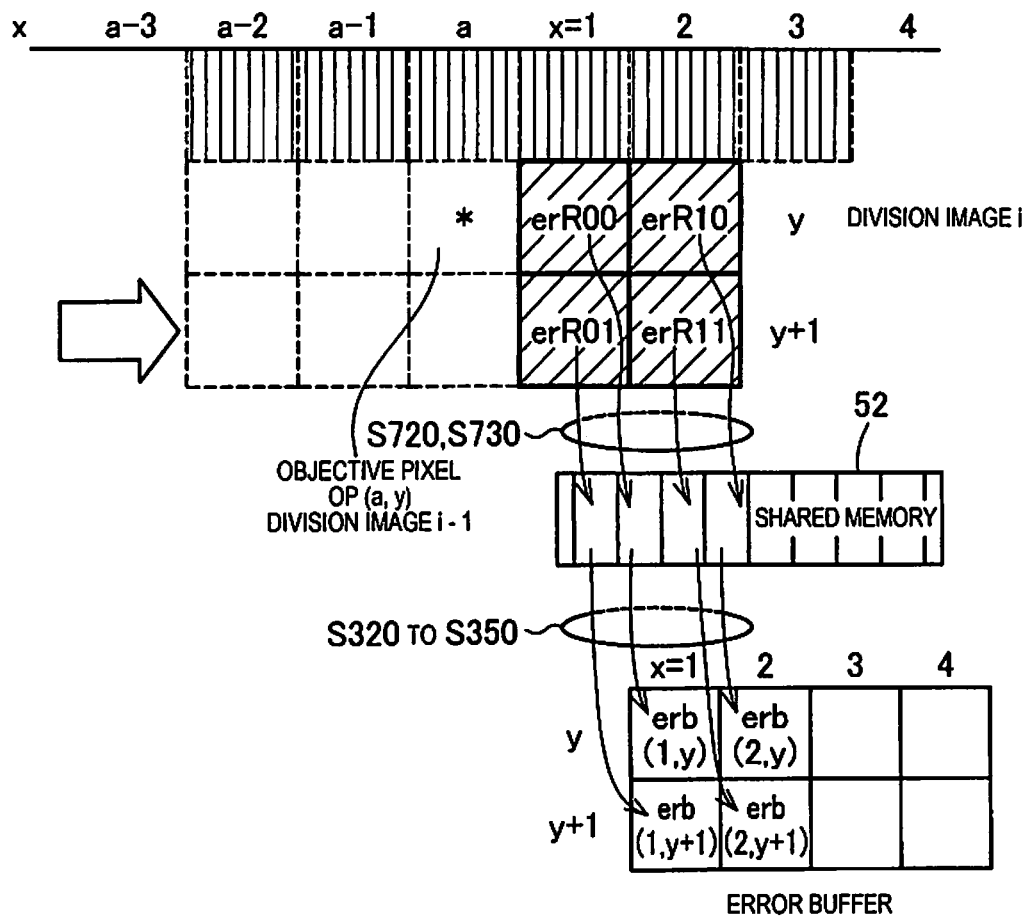
FIG. 10 is a descriptive diagram illustrating an example of exchange of the diffusion error that occurs by the error diffusion method-based processing in a right end of a prescribed raster of the division image.

In FIG. 10, a mode is illustrated in which in the right end of the division image, the diffusion error is received by an adjacent unit. FIG. 10 illustrates a mode in which the diffusion error is output when the error diffusion method-based processing (Step S500) of the division image i−1 in the y raster is performed on up to the right end of the y raster, more precisely, the objective pixel OP (a, y). At this time, the gradation error Ed in the objective pixel OP (a, y) is diffused in a range that corresponds to seven pixels in the neighborhood. At this time, the diffusion error that is diffused in a position that is positioned rightward from the objective pixel is added for being written into the shared buffers erR00 and erR01 of the shared memory 52 and is written into the shared buffers erR10 and erR11.

In Step S710, when it is determined that the x coordinate is equal to a, subsequent to Steps S720 and S730, update processing in the error buffer (Step S740) is performed. As already described, because the error diffusion method-based processing on one raster is ended, the processing clears contents of the first area error buffer that corresponds to the raster y of which the use is completed and, at the time of processing of the raster y+1, sets the first area error buffer to be a new second area buffer in which the diffusion error into the raster y+2 is stored. Furthermore, at the same time, the current second area error buffer is set to be the first area error buffer at the time of the processing of the raster y+1 without any change.

When the ED1 performs the R end-portion error output processing (Step S700) illustrated in FIG. 9, the diffusion error by the error diffusion method-based processing in the right end in the main scanning direction, of the division image 1 is retained in the shared buffers erR00, erR01, erR10, and erR11 of the shared memory 52. Therefore, as illustrated in FIG. 8, the ED2 that waits until the ED1 completes the error diffusion processing of the first raster 1 (generally, the N-th raster) receives this and starts processing operations in Step S320 and subsequent steps, that is, the processing of the raster 1 (generally, the N-th raster) of the division image 2. In Step S320, processing is performed that reads the diffusion error which has to be diffused at coordinates (1, y) and (2, y) from the shared buffers R00 and erR10 of the shared memory 52. Furthermore, subsequently, processing is performed that reads the diffusion error which has to be diffused at coordinates (1, y+1) and (2, y+1) from the shared buffers erR01 and erR11 of the shared memory 52 (Step S330).

In addition to this, processing (Step S340) that writes the diffusion errors which are read from the shared buffers erR00 and erR10, as the diffusion errors erb (1, y) and erb (2, y), into the first area error buffer, and processing (Step S350) that writes the diffusion errors from the shared buffers erR01 and erR11, as the erb (1, y+1) and the erb (2, y+1), into the second area error buffer are executed. This mode is also illustrated in FIG. 10. As described above, the ED2 ends the R end-portion error input processing (Step S300). In the embodiment, as described above, the adjacent ED2 collectively reads the R end-portion errors processed by the ED1, but the R end-portion errors may be delivered by being divided into two groups. More precisely, the ED1 may perform delivery of the first group to the adjacent ED2 at a point in time at which the processing in the pixel OP (a–1, y) in the raster y is ended, and the ED1 may perform delivery of the second group to the ED2 at a point in time at which the processing on the pixel OP (a, y) is ended. In this case, the diffusion error erb (1, y) for the adjacent ED2 to obtain the gradation correction value in the pixel OP (1, y) is added to on the ED2 side and is determined. The diffusion error erb (2, y) for the pixel OP (2, y) is delivered as a value that is determined when the second group is delivered.

As described above, the ED2 that processes the image 2 which is positioned toward the main scanning direction between the ED1 and the ED2 that process the division images 1 and 2, respectively, waits for the ED1 that processes the image 1 which is positioned toward the direction opposite to the main scanning direction to end the error diffusion method-based processing on up to the right end of the raster y (firstly, the raster 1) that is equivalent to the N-th raster. Furthermore, when the ED1 ends the processing for the error diffusion in the pixel OP (a, y) at the right end of the raster y, the ED2 receives the diffusion error that is determined by the processing in the raster y, through the shared memory 52, and starts the processing of the raster y (firstly, the raster 1) that is equivalent to the N-th raster. At this time, because the ED2 takes over an error from the ED1, the error is also taken over at the border between the image 1 and the image 2, a pseudo-contour does not occur in the image on which the halftone processing is performed. It is noted that this relationship is the same as between the ED2 and the ED3 that process the division images 2 and 3, respectively.

When the R end-portion error input processing (Step S300) is ended, the ED2 starts processing operations in Step S400 and subsequent steps. Step S400 is the L end-portion error input processing (Step S400). In the same manner as input processing and out processing (Step S300 and S700) relating to the error in the R end portion, which are illustrated in FIGS. 8 and 9 are paired with each other, the L end-portion error input processing (Step S400) and the L end-portion error output processing (Step S600) are processing operations that are paired with each other. Both the processing operations (Step S400 and S600) will be described below with reference to FIGS. 11 to 13.

Figure 11:
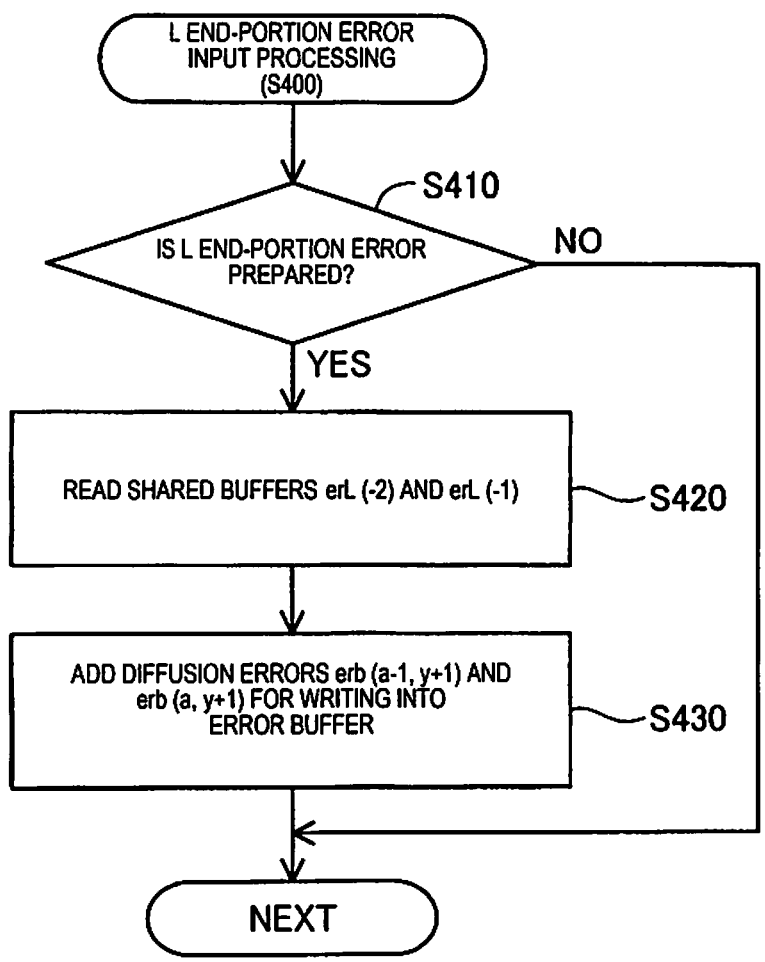
FIG. 11 is a flowchart illustrating a detail of L end-portion error input processing (Step S400).

The L end-portion error input processing (Step S400), as illustrated in FIG. 11, when started, first makes a determination of whether or not the diffusion error at the L end portion is prepared (Step S410). As illustrated in FIG. 6, the L end-portion error is the diffusion error into the pixel in the (N+1)-th raster, which occurs in the error diffusion method-based processing in the pixel at the end portion (the left end) in the direction opposite to the main scanning direction, of the EDi that sequentially processes the pixels in the N-th raster, of the division image i. The diffusion error is transferred to the EDi–1 that processes the image i–1 that is positioned to a side (a left side) of the division image i, which is toward the direction opposite to the main scanning direction. Therefore, the EDi–1 does not perform anything until, with the L end-portion error output processing (Step S600), the EDi prepares the L end-portion error in the shared buffers erL (–2) and erL (–1) of the shared memory 52, and processing proceeds to "NEXT" and temporarily ends the present processing routine. For this reason, the EDi–1 performs the error diffusion method-based processing (Step S500) without inputting the L end-portion error, and continues the halftone processing while moving one x coordinate of the objective pixel at a time.

Figure 12:
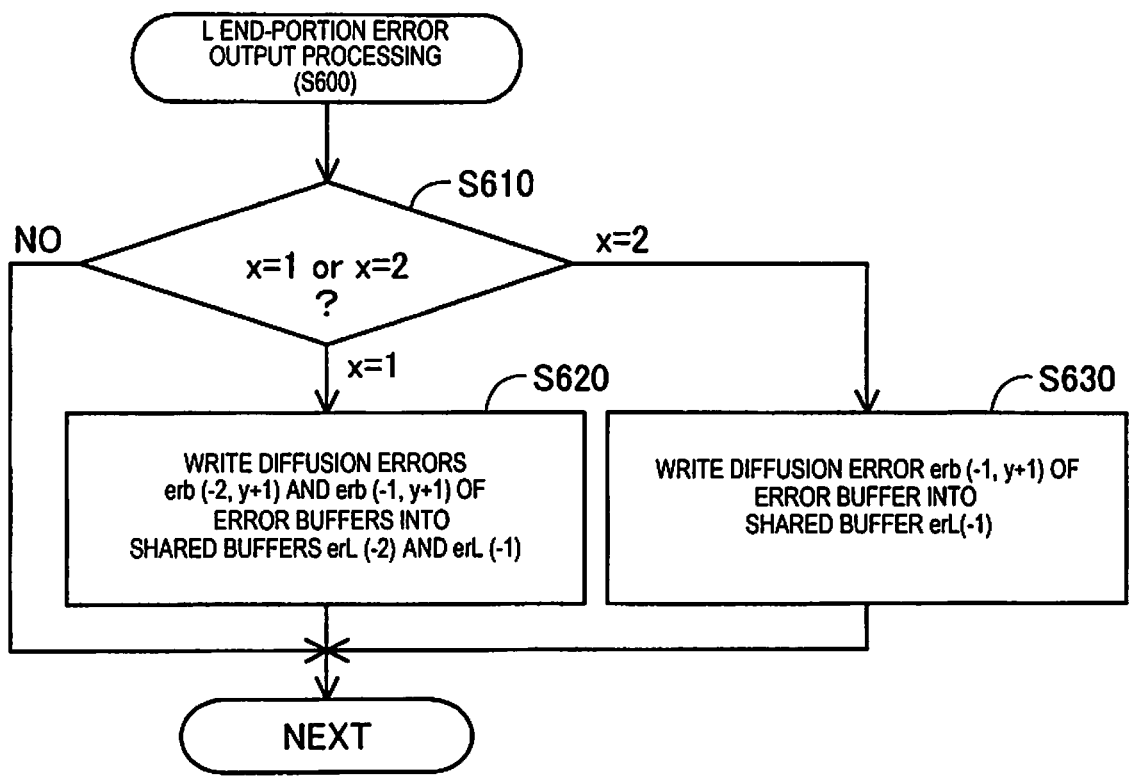
FIG. 12 is a flowchart illustrating the detail of L end-portion error output processing (Step S600).

In the meantime, the adjacent EDi performs the error diffusion method-based processing (Step S500) and processing that outputs the result of the halftone processing (Step S230), on a leading pixel in each raster, of the division image i, more precisely, the pixel OP (1, y), and subsequently performs the L end-portion error output processing (Step S600). The L end-portion error output processing (Step S600) is illustrated in FIG. 12. In the L end-portion error output processing (Step S600), first, a determination is made of whether the x coordinate in the main scanning direction is a value of 1 or 2 (Step S610). The x coordinate is the value of 1 when the halftone processing illustrated in FIG. 4 is for the first time performed on the division image i, and the x coordinate is the value of 2 when the halftone processing is performed for the second time.

Therefore, x=1 is obtained immediately after the processing on the division image i is started, and, among the diffusion errors that are diffused into the neighborhood of the objective pixel in the error diffusion method-based processing (Step S500), the diffusion errors erb (–2, y+1) and erb (–1, y+1) are read from the second area error buffer, and are written into the shared buffers erL (–2) and erL (–1) of the shared memory 52 (Step S620). At this time, the diffusion error erb (–2, y+1) is the determined diffusion error as the diffusion error that is delivered from the ED2 to the ED1. On the other hand, when the processing is performed for the second time, x=2 is obtained, and, among the diffusion errors that are diffused into the neighborhood of the objective pixel in the error diffusion method-based processing (Step S500), the diffusion error erb (–1, y+1) is read from the second area error buffer and is added and written into the shared erL (–1) of the shared memory 52 (Step S630). The addition and writing of the diffusion error into the shared buffer means that, when the diffusion error is already written into the shared buffer, addition to this is performed. Because, in some cases, a negative value of the diffusion error is present, the addition and subtraction processing operations are actually performed. With the addition and subtraction processing operations, any one of the diffusion errors erb (–2, y+1) and erb (–1, y+1) that are stored in the second area error buffer is determined as the diffusion error that is handed over from the ED2 to the ED1. More precisely, when, with the L end-portion error output processing (Step S600), the EDi prepares the L end-portion error in the shared buffers erL (–2) and erL (–1) of the shared memory 52, contents of the shared buffer erL (–2) are determined at a point in time at which the EDi ends the error diffusion method-based processing on the pixel OP (1, y), and contents of the shared buffer erL (–1) are determined at a point in time at which the EDi ends the error diffusion method-based processing on the pixel OP (2, y).

The reason for the division of the processing with the x coordinates in the main scanning direction as the value of 1 and the value of 2 is that, according to the size of the error diffusion matrix illustrated in FIG. 6, when x=2, the writing is limited to the diffusion error erb (–1, y+1) that is stored in the second area error buffer. If the processing proceeds and the x coordinate is at or above a value of 3 ("NO" in Step S610), proceeding to "NEXT" takes place and nothing is performed in the L end-portion error output processing (Step S600).

Figure 13:
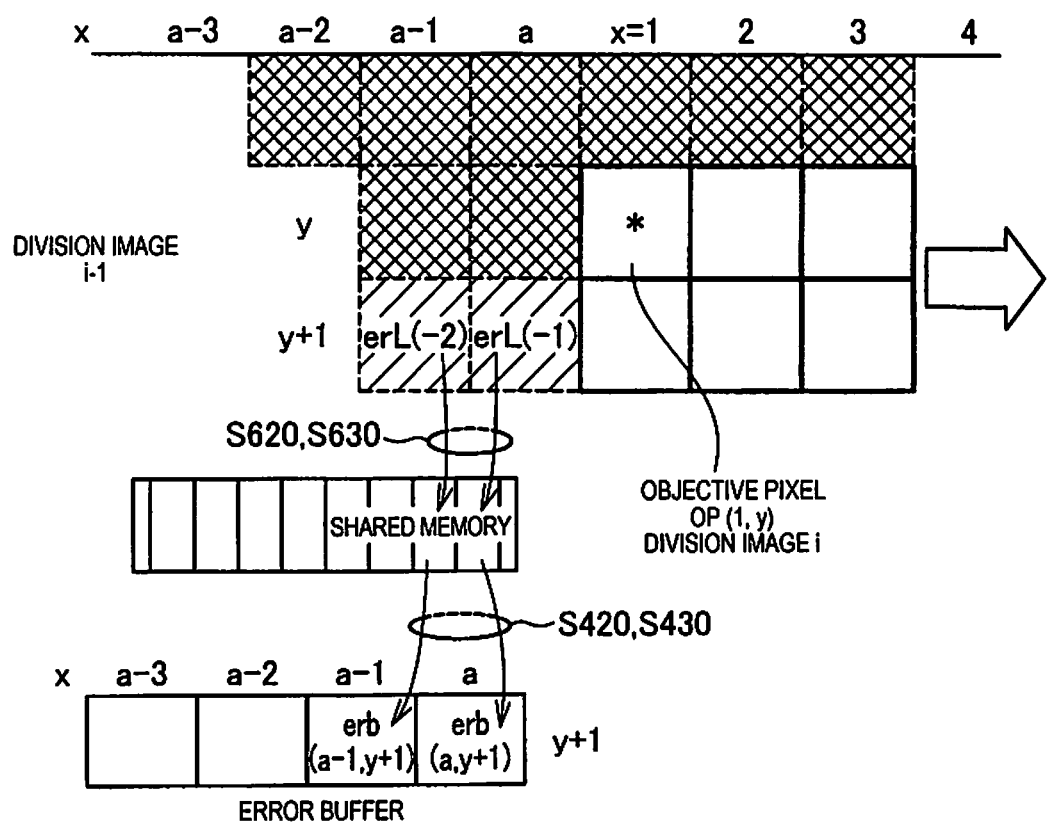
FIG. 13 is a descriptive diagram illustrating an example of the exchange of the diffusion error that occurs by the error diffusion method-based processing in a left end of the prescribed raster of the division image.

This mode is illustrated in FIG. 13. In this way, when the L end-portion error is prepared in the shared buffer, a result of the determination in Step S410 in the L end-portion error input processing (Step S400 in FIG. 11) is "YES", and the EDi−1 reads the diffusion error retained in the shared buffers erL (−2) and erL (−1) (Step S420) and adds the diffusion error to the diffusion errors erb (a−1, y+1) and erb (a, y+1) for writing into the second area error buffer (Step S430). A mode in which the diffusion error is transferred from the shared buffer of the shared memory 52 is illustrated in FIG. 10. It is noted that, in this example, processing when x=1 or 2 in the L end-portion error output processing (Steps S620 and S630 in FIG. 12) is performed, the diffusion errors erb (−2, y+1) and erb (−1, y+1) that are written into the second area error buffer are prepared in the shared buffers erL (−2) and erL (−1) of the shared memory 52, and are determined as the diffusion errors, and then it is determined that the L end-portion error is prepared. Therefore, the L end-portion error input processing illustrated in FIG. 11 is performed only one time after the diffusion errors erb (−2, y+1) and erb (−1, y+1) are written into the shared buffers erL (−2) and erL (−1) and are determined. Of course, only the diffusion error erb (−2, y+1) that is processed by the adjacent EDi is necessary when the EDi−1 processes the pixel OP (a−1, y+1) in the raster y+1. Thus, at a point in time at which the diffusion error is written into the shared buffer erL (−2), although preparation is made in such a manner that the diffusion error erb (a−1, y+1) necessary for processing of the pixel OP (a−1, y+1) is read from the shared buffer erL (−2) and that EDi−1 performs the error diffusion method-based processing on the pixel OP (a−1, y+1), this does not impose any problem. In this case, processing in the pixel OP (2, y) in the raster y is performed in the adjacent EDi, the diffusion error erb (−1, y+1) is written into the shared buffer erL (−1), and then preparation may be made in such a manner that the diffusion error erb (a, y+1) necessary for processing of the pixel OP (a, y+1) is read from the shared buffer erL (−1) and that the EDi−1 performs the error diffusion method-based processing on the pixel OP (a, y+1). More precisely, the delivery of the L end-portion error from the adjacent EDi to the EDi−1, as illustrated in FIGS. 11 and 12, may be performed all at once for two pixels, and although the delivery is performed for one pixel at a time, this does not impose any problem.

As described above, the L end-portion error input processing (Step S400) and the L end-portion error output processing (Step S600), are performed between the EDi−1 and EDi that are adjacent to each other and thus the error is also delivered from the EDi toward the EDi−1 at the border between the division image i−1 and the division image i that are adjacent to each other. As a result, the pseudo-contour or the like does not occur to the result of the halftone processing that uses an error diffusion method-based processing in a border area.

When the halftone processing (FIG. 4) described above is performed by each EDi, the processing actually proceeds as follows.

<1> The ED1 that processes the division image 1 is activated, image data for one raster is input, the halftone processing of the image data is sequentially performed in the forward direction with the error diffusion method-based processing, starting from x=1, and the result of the processing is written into a prescribed area in the RAM 60.

<2> When the ED1 causes the processing of one raster to advance and the processing is performed on up to the right end, the R end-portion error output processing (Step S700) is performed, and the R end-portion error that has to be handed over to the ED2 is prepared in the shared buffers erR00 to erR11

<3> In response to this, the ED2 that inputs the image data for one raster, of the division image 2 and waits performs the R end-portion error input processing (Step S300), inputs the R end-portion error prepared by the ED1 into its own first and second area error buffers, and thereafter, performs the error diffusion method-based processing (Step S500), starting from x=1.

<4> When the error diffusion method-based processing (Step S500) on the pixels OP (1, y) and OP (2, y) is ended, the ED2 performs the L end-portion error output processing (Step S600). As a result, the diffusion errors erL (−2) and erL (−1) that have to be handed over to the ED1 are prepared.

<5> Concurrently with this, the ED1 inputs the image data in the next raster y+1, repeatedly performs processing operations from the L end-portion error input processing (Step S400) to the R end-portion error output processing (Step S700), continues the halftone processing on the raster y+1, and when the L end-portion error is prepared by the ED2 in the shared buffers erL (−2) and erL (−1), inputs the L end-portion error into its error buffer in the L end-portion error input processing (Step S400). If the error diffusion method-based processing is performed by the ED1 on up to the right end of the raster y+1, precisely, an x coordinate a−1, the L end-portion error input processing (Step S400) that inputs the L end-portion error from the shared buffers erL (−2) and erL (−1) into the error buffer may be performed at any timing. Although the processing is performed on up to the x coordinate a−2 and the error diffusion method-based processing on the pixel OP (a−2, y+1) is ended, when the L end-portion error is not yet prepared in the shared buffers erL (−2) and erL (−1), the L end-portion error input processing may wait until the L end-portion error is prepared.

With the processing described above, between the ED1 and the ED2, the R end-portion error that is the forward-direction diffusion error of the ED1 is handed over to the ED2 and is used in the error diffusion method-based processing (Step S500) in the ED2, and the L end-portion error that is an opposite-direction diffusion error of the ED2 is handed over to the ED1 and is used in the error diffusion method-based processing (Step S500) in the EDl. As a result, the diffusion error is also handed over in the error diffusion method-based processing at the border between the two division images, the division images 1 and 2. The same processing is also performed between the ED2 and the ED3. In a case where 4 or more division images are present and where 4 or more ED units are present, of course, the processing is performed in the same manner.

As described above, in the printer 20 according to the first embodiment described above, an image that is a target for the halftone processing is divided into three division images, i.e., the images 1, 2, and 3, and the processing using the error diffusion method is performed in the ED1, the ED2, and the ED3. At this time, each EDi may only prepare the first and second area error buffers that have a capacity of two rasters for the number of pixels a in the main scanning direction x of a corresponding division image. Among the ED1, the ED2, and the ED3, the ED1 first starts an operation, performs processing on up to the right end (a, y) of the raster y that is processed, and outputs the R end-portion error to the shard buffer of the shared memory 52. Then, the ED2 adjacent to the ED1 starts the R end-portion error input processing (Step S300). When inputting the R end-portion error and performing the error diffusion method-based processing (Step S500), the ED2 performs the L end-portion error output processing (Step S600) at a position of x=1 or x=2, more precisely, immediately after the ED2 starts the error diffusion processing in FIG. 4. Because of this, the L end-portion error in the ED1 is prepared considerably long before the objective pixel that is processed by the ED1 reaches the right end of the raster. For this reason, at a point in time at which the ED1 processes the right end of the raster y+1, the L end-portion error is prepared.

The same processing is also performed between the ED2 and the ED3. Therefore, the division images 1, 2, and 3 are sequentially processed in a manner that is delayed by a difference that corresponds to approximately the time it takes to complete the error diffusion method-based processing (Step S500) for one raster, more precisely, by a difference that corresponds to the time necessary for the processing operations for one raster from the R end-portion error input processing (Step S300) to the R end-portion error output processing (Step S700).

For this reason, the time necessary for the processing of an image that uses the error diffusion method can be shortened by approximately one-third of the time for one ED unit to process an entire image. What is more, by increasing the number of ED units, the processing time can be shortened almost according to the number of ED units. Although the number of ED units increases, the processing described (FIG. 4) may be performed by each ED unit, and there is seldom a need to correct details of the processing in a manner that corresponds to the increase in the number of units. More precisely, the printer 20 can employ a so-called scalable configuration that can flexibly correspond to the increase in the number of ED units. Furthermore, in the printer 20 according to the present embodiment, the error diffusion method-based processing (Step S500) is not performed while the L end-portion error output processing (Step S600) or the R end-portion error output processing (Step S700) is performed. For this reason, the error diffusion method-based processing (Step S500) of each pixel that makes up the raster and the processing that delivers the diffusion error to the adjacent error diffusion processing unit are separated and thus both the processing operations can be together performed reliably.

5. ANOTHER EMBODIMENT

It is possible that the first embodiment described above is implemented in embodiments that are different from the first embodiment in terms of the following respects. First, in the embodiment described above, the size in the x direction, of the division image is the same, but may differ from one division image to another without being necessarily the same. In this case, in the ED unit in charge of the division image, the number of whose pixels in the x direction is small, in some cases, the waiting time can be taken to start the R end-portion error input processing (Step S300) that inputs the R end-portion error from the ED unit that is positioned toward the main scanning direction, but, with multiple ED units, the entire image processing time can also be shortened in the same manner. Furthermore, in the first division image, the L end-portion error output processing (Step S600) is not necessary, and in the last division image, the R end-portion error output processing (Step S700) is not necessary. Because of this, it is also possible that the first and last division images are somewhat increased and thus that the processing times for the all ED units are averaged. It is noted that in the ED unit that processes the division images at both the ends, the L end-portion error output processing (Step S600) or the R end-portion error output processing (Step S700) is not performed, but at both the ends of the raster, the processing that diffuses the diffusion error at a position that corresponds to a pixel out of an area, for example, coordinates (−2, y) or the like may be performed without any change.

Although the size of the error diffusion matrix is a size other than the one in FIG. 6, this does not pose any problem. When the objective pixel is in the raster y, although the error diffusion range is extended not only to y+1, but also to y+2 or in the y direction, this does not pose any problem. Furthermore, according to a gradation value of a pixel that is a target for the error diffusion method-based processing, or a position of the objective pixel within a raster, it is also impossible that the size or the weighting of an error diffusion matrix is switched.

In the embodiment described above, in the R end-portion error output processing (Step S700) or the L end-portion error output processing (Step S600), the output processing is individually performed on the pixels OP (a−1, y) and OP (a, y) or the pixels OP (1, y) and OP (2, y), but each of the error in the pixel OP (a−1, y) and the error in the pixel OP (1, y) is added in the processing in the pixel OP (a, y) or the pixel OP (2, y) at the next position (Steps S730 and S630), and because of this, may be temporarily stored within the ED unit and may be collectively written into the shared buffer of the shared memory 52 without being written into the shared memory 52 each time. Furthermore, in such a case, the addition processing of the error that is added for being written into the same shared buffer is performed within the ED unit before being written, and thus the writing into the shared buffer can be completed one time. In the embodiment described above, the shared buffers for two rasters, the shared buffers erR00 and erR10 in which the diffusion error into the same raster is stored and the shared buffers erR01 and erR11 in which the diffusion error into the next raster is stored are prepared for the R end-portion error, but this can be achieved only with the shared buffers erR00 and erR10 that are used for the diffusion error into the same raster. In such a case, in the embodiment described above, the diffusion error into the next raster, which is written into the shared buffers erR01 and erR11, is stored in internal buffers erR01i and erR11i that are prepared in a memory within the ED unit and moves for the processing of the next raster. Accordingly, at a point in time at which the diffusion error is written from the same raster into the shard buffers erR00 and erR10, a state is entered where the diffusion error from the immediately preceding raster is stored in the internal buffers erR01i and erR11i. Thus, the diffusion error from the immediately preceding raster, which is stored in the internal buffer erR01i, is added for being written in the shared buffer erR00 in addition to the diffusion error from the same raster, and in the same manner, the diffusion error from the immediately preceding raster, which is stored in the internal buffer erR11i, is added for being written in the shared buffer erR10 in addition to the diffusion error from the same raster. Thereafter, for storage, the diffusion error into the next raster may be written in the internal buffers erR01i and erR11-i, the use of which is completed.

In the embodiment described above, for the diffusion buffer of each ED unit, two area error buffers, the first area error buffer and the second area error buffer, are used, but it is also possible that a storage capacity thereof is reduced. This uses the fact that when the gradation error Ed is diffused, the diffusion error in the main scanning direction of the same raster, of the objective pixel OP (x, y) is used for the determination in a sequential error diffusion method and ends its role, and that, on the other hand, in the immediately following raster y+1 of the objective pixel, if the error diffusion matrix illustrated in FIG. 6 is used, the diffusion error at a position that is positioned farther than a position of x+3 is not present in the x coordinate. In this case, the first area error buffer that ends its role is put to another use as the second area error buffer at the same raster position, and thus a capacity of the error buffer necessary for one ED unit can be suppressed to the degree of (the number of pixels for one raster+α+β). At this point, a is the number of pixels that overlap in the raster y and the raster y+1. In the error diffusion matrix illustrated in FIG. 6, overlapping takes place at x+1 and x+2 in the main scanning direction, and because of this, α=2. In this case, the diffusion error into a pixels with coordinates x+1 and x+2 in the raster y+1 are temporarily stored in a error buffer areas that are prepared separately, and contents that are temporarily stored may be reflected at a stage where the second area error buffer of a corresponding pixel is usable. Furthermore, β is the number of buffers necessary for exchanging the diffusion errors between the adjacent ED units. In the first embodiment, there is a need for four buffers for the R end-portion error and two buffers for the L end-portion error, and the sum is β=6.

Figure 14:
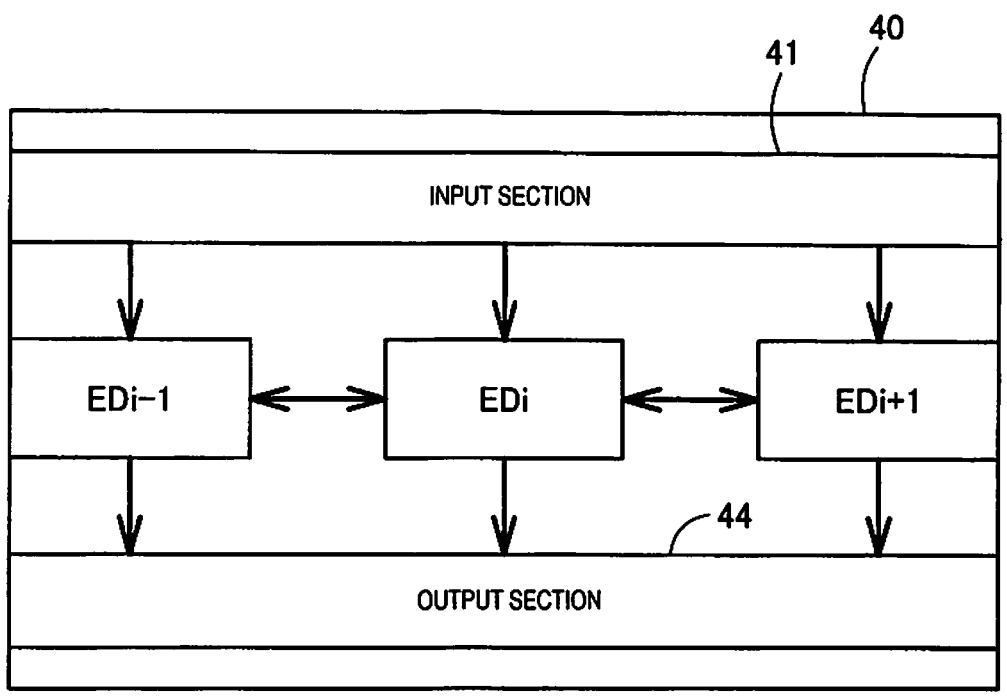
FIG. 14 is a descriptive diagram illustrating a configuration in which an input unit and an output unit exchange data among multiple ED units.

In the first embodiment, the shared memory 52 is used for the exchange of the diffusion errors between the ED units, but various configurations, as illustrated in FIGS. 14 to 18, are employable for the exchange of the diffusion errors between the ED units. In a configuration illustrated in FIG. 14, each of the EDi−1, the EDi, and the EDi+1 is connected to the input section 41 and an output section 44. At this point, the output section 44 is an interface unit that functions when outputting the result of the halftone processing to the printing section 46 (Step S230 in FIG. 4). In the configuration illustrated in FIG. 14, each of the EDi−1, the EDi, and the Edi+1 is capable of transmitting and receiving data to and from each of the input section 41 and the output section 44 by itself, and the R end-portion error or the L end-portion error is exchangeable between each of the EDi−1, the EDi, and the EDi+1. With this configuration, because each of the EDi−1, the EDi, and the EDi+1 directly exchanges images or diffusion errors with each unit, for example, it is also possible that the exchanges of the R end-portion error and the L end-portion error are performed simultaneously. Furthermore, if a configuration in FIG. 14 is employed, when each of the EDi−1, the EDi, and the EDi+1 receives a division image i−1, a division image i, and a division image i+1 through the input section 41, each of the EDi−1, the EDi, and the EDi+1 can independently receive one raster at a time. For this reason, a transfer path for data that is connected to the input section 41 is not congested with a data request that is received from each of the EDi−1, the EDi, and the EDi+1.

Figure 15:
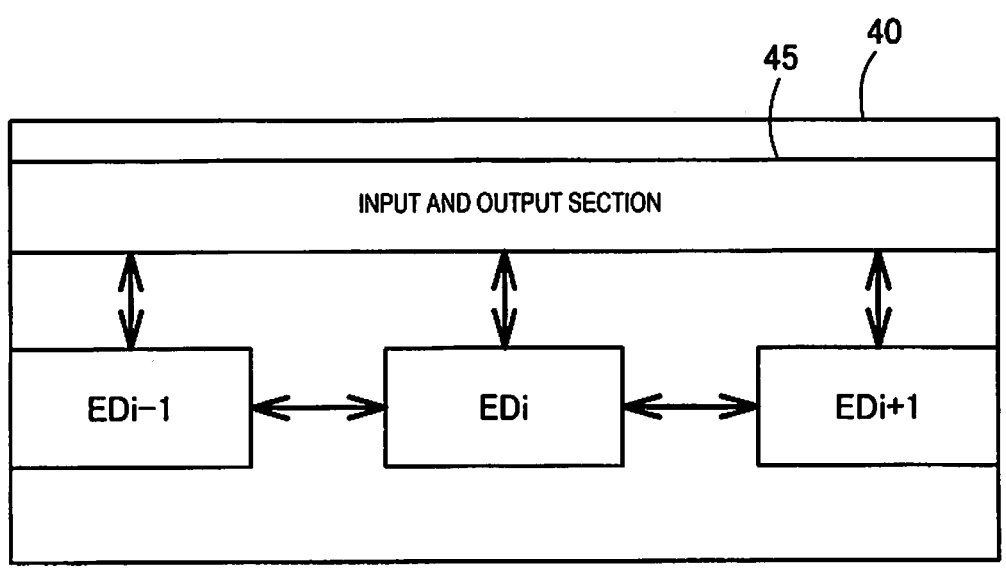
FIG. 15 is a descriptive diagram illustrating a configuration in which data is exchanged using a common input and output unit among the multiple ED units.

Although a configuration in which the exchange between each of the EDi−1, the EDi, and the EDi+1 and the outside is performed through one input and output section 45 without division into the input section 41 and the output section 44 is employed as an internal configuration of the CPU 40, this does not impose any problem. A configuration in this case is illustrated in FIG. 15. In FIG. 15, the exchange between each of the EDi−1, the EDi, and the EDi+1 and the outside is the same as that in FIG. 14 except that the integration into the input and output section 45 is made. A timing (Step S220 in FIG. 4) for receiving data for one raster from the division image and a timing (Step S230) for outputting the result of the halftone processing can be separated. Because of this, competition for both does not take place, and an entire configuration can be made compact.

Figure 16:
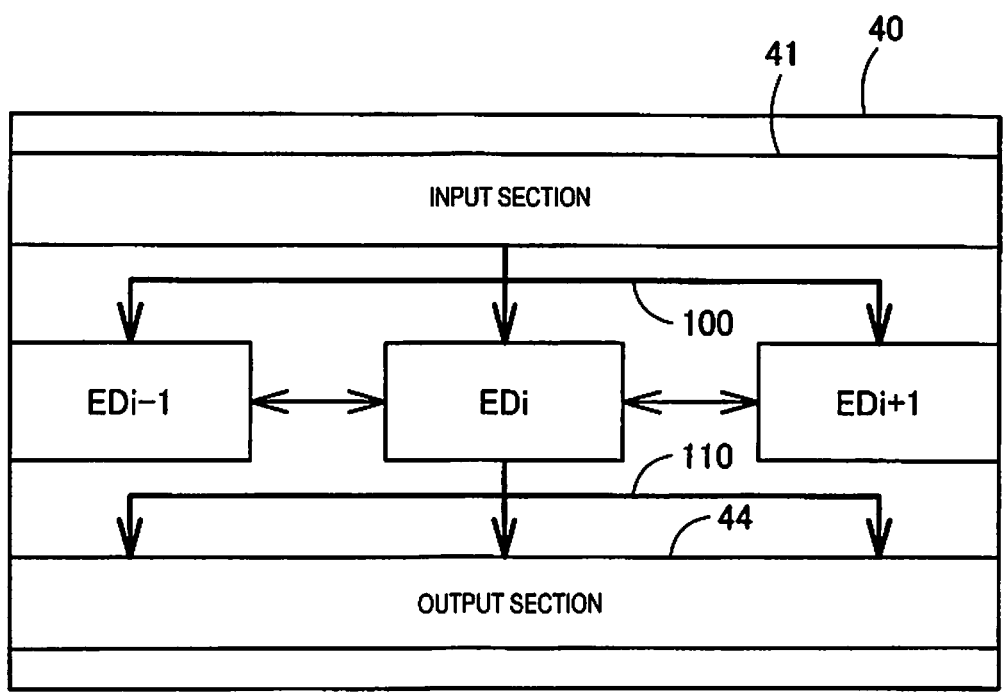
FIG. 16 is a descriptive diagram illustrating a configuration in which the data is exchanged using a transfer path among the multiple ED units.
Figure 17:
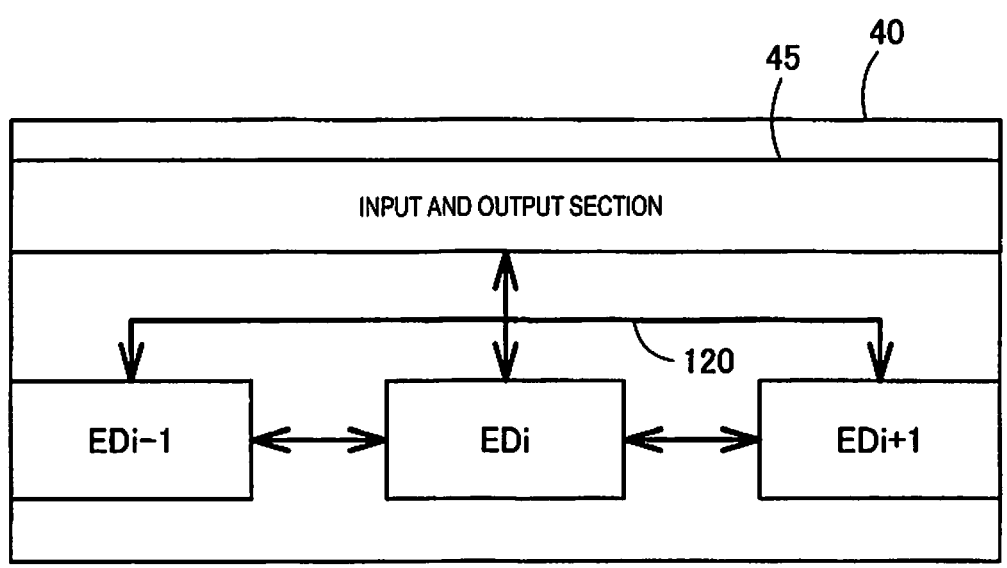
FIG. 17 is a descriptive diagram illustrating a configuration in which the data is exchanged using the common input and output unit and the transfer path among the multiple ED units.

FIGS. 16 and 17 illustrate a configuration in a case where, in a configuration illustrated in FIGS. 14 and 15, a change is made in such a manner that the exchange between each of the EDi−1, the EDi, and the EDi+1 and the input section 41 and between each of the EDi−1, the EDi, and the EDi+1 and the output section 44 is performed using each of dedicated transfer paths 100, 110, and 120. In the configuration illustrated in each of FIGS. 16 and 17, each of the EDi−1, the EDi, and the EDi+1 does not exchange the data with the input section 41, the output section 44 or the input and output section 45 by itself, but exchanges the data using the common transfer paths 100, 110, and 120. For this reason, when a new ED unit is added, connections to the transfer paths 100, 110, and 120 are also made, and a protocol for exchanging data with the input section 41 or the output section 44, or with the input and output section 45 may be installed in each of the EDi−1, the EDi, and the EDi+1. An entire configuration can be employed as a more flexible configuration without the need for switching the input section 41, the output section 44, or the like according to the number of ED units to be connected. In this configuration, data input for one raster into the EDi−1, the EDi, and the EDi1 in this order is performed in a time-series manner, without performing the data input in the ED units simultaneously. Furthermore, this is the same for data output. In this case, while the data input for one raster into the EDi is performed, the EDi−1, the data input into which is already ended, may start the halftone processing. In FIGS. 16 and 17, data transfer is performed in one direction along each of the transfer paths 100 and 110, and is performed bidirectionally along the transfer path 120. Furthermore, in the configuration illustrated in each of FIGS. 16 and 17, the exchange of the R end-portion error or the L end-portion error between each of the ED units is performed directly between each of the ED units.

Figure 18:
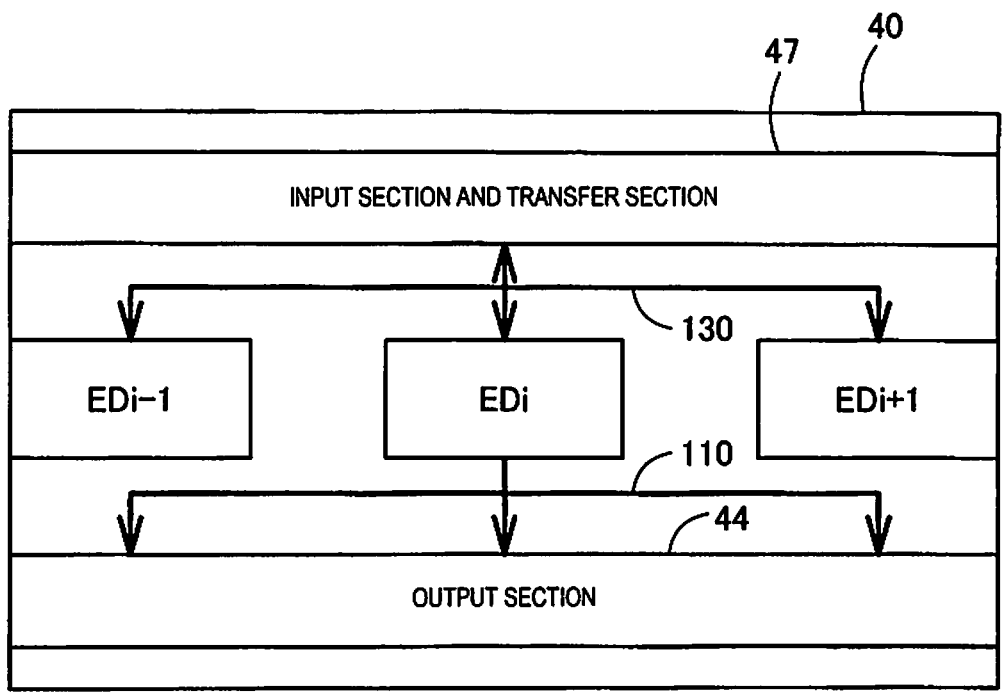
FIG. 18 is a descriptive diagram illustrating a configuration in which the exchange of the diffusion error among the multiple ED units is performed using the transfer path.
Figure 19:
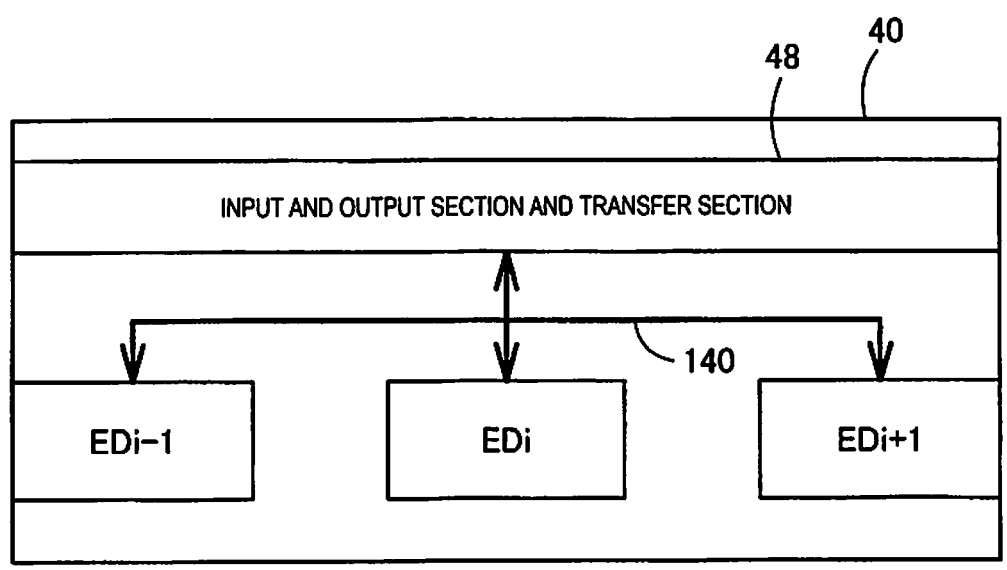
FIG. 19 is a descriptive diagram illustrating a configuration in which the exchange of the diffusion error among the multiple ED units and output of the data, the halftone processing on which is completed, are also performed using the transfer path.

FIGS. 18 and 19 illustrate a configuration in a case where the exchange of data, more precisely, the R end-portion error or the L end-portion error, between each of the EDi−1, the EDi, and the EDi+1 is also performed using transfer paths 130 and 140. In the configuration illustrated in FIG. 18, an input section and transfer section 47 that performs control which uses the transfer path 130. Using the transfer path 130, each of the EDi−1, the EDi, and the EDi+1 performs processing (Step S220 in FIG. 4) that inputs image data for one raster from each division image, from the input unit of the input section and transfer section 47, or input and output processing (Steps S300 and S700) of the R end-portion error through the transfer unit of the input section and transfer section 47, and input and output processing (Steps S400 and S600) of the L end-portion error. Because multiple ED units, the EDi−1, the EDi, and the EDi+1 perform exchange of these data using one transfer path 130, there is no need to separately provide a transfer path for exchanging data directly between each of the EDi−1, the EDi, and the EDi+1. On the other hand, the input section and transfer section 47 needs a function of arbitrating a request for the transfer path 130. In a configuration illustrated in FIG. 19, because output of the result of the halftone processing is also performed using the transfer path 140 and an input and output section and transfer section 48, the configuration can be further simplified. On the other hand, a request for the use of the transfer path 140 increases further, and a need for bus arbitration increases all the more.

As illustrated in FIG. 4, because the R end-portion error input processing (Step S300) is performed immediately after the input (Step S220) of the data for one raster, of the division image, regarding the processing between each of the EDi−1, the EDi, and the EDi+1, starting of the processing by the ED unit at a later state is delayed by the time that it takes to complete the error diffusion method-based processing (Step S500) of at least one raster, more precisely, to possibly output the R end-portion error. On the other hand, before the ED unit at an earlier stage ends the processing of the image data for the one raster, the L end-portion error input processing (Step S400) has to be possible. More precisely, the ED unit at a later stage ends the error diffusion method-based processing (Step S500) on the L end portion by then, and thus the L end-portion error output processing (Step S600) has to be possible. In other words, if these conditions are satisfied, it is possible that a timing for the processing between each of the EDi−1, the EDi, and the EDi+1 is set freely. For this reason, when the transfer path 130 or the transfer path 140 is used, the timing for the processing by each of the ED units may also be set in such a manner that competition for the transfer path 130 or the like does not take place, for example, in such a manner that, although the competition takes places, the waiting time decreases by the bus arbitration.

Figure 20:
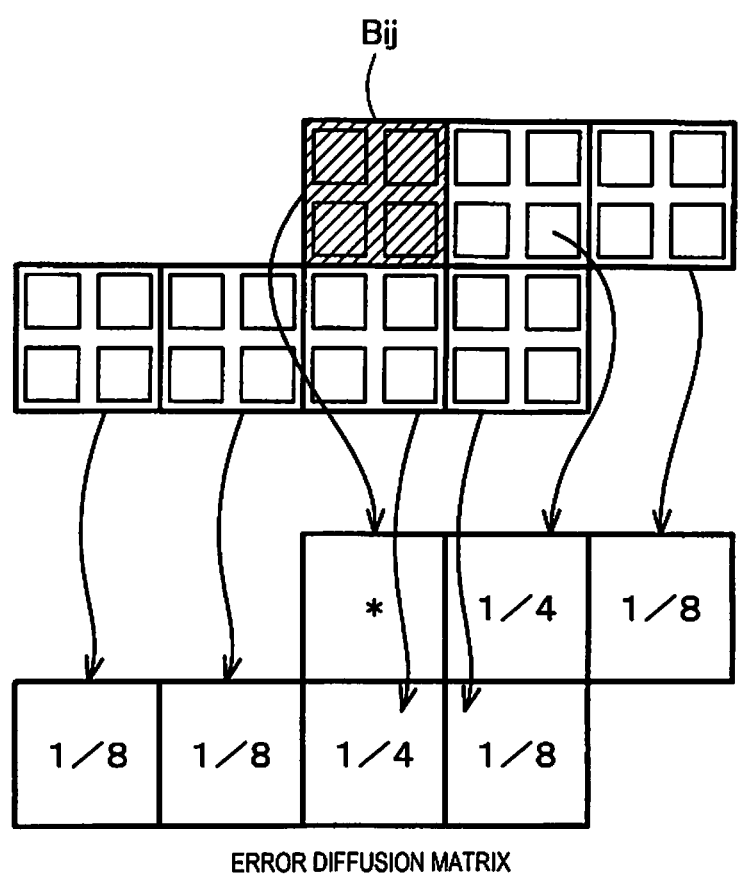
FIG. 20 is a descriptive diagram illustrating a technique in which the error diffusion is performed among blocks.

In the embodiment described above, the error diffusion method-based processing is performed on a per-pixel basis, but multiple pixels, for example, four pixels in 2 rows×2 columns, may be handled as one block, and an error may be diffused between each of the blocks. FIG. 20 is a descriptive diagram illustrating a technique for the error diffusion between each of the blocks. As illustrated, the ON and OFF states of the dot are determined for a pixel that is included within one block Bij, and an error that occurs due to this is diffused into the block in the neighborhood, with a weighting that is set to be in the error diffusion matrix. The determination of the ON and OFF states of the dot for the pixel within each block may be determined with a dithering method that uses an average value of gradation values of the pixel within the block. The error diffusion method-based processing between the blocks is disclosed in detail in JP-A-2016-116105 and others.

6. OTHER IMPLEMENTATION EXAMPLE

[1] The image processing apparatus according to the present disclosure can be implemented as the following configurations. A first aspect is directed to an image processing apparatus that sequentially performs halftone processing of a two-dimensional image, extending in lengthwise and crosswise directions and including a plurality of pixels, in one of the lengthwise and crosswise directions as a main scanning direction. The image processing apparatus includes n (n is an integer of 2 or more) error diffusion processing units that are respectively provided to correspond to division images obtained by dividing the image into n images in the main scanning direction, sequentially sets pixels belonging to a raster which is a row of pixels in the main scanning direction of the division image as an objective pixel, and applies an error diffusion method to the objective pixel to perform the halftone processing, and an output unit that combines results processed by the n error diffusion processing units and outputs processed data having a gradation value less than a gradation value that is included in the division image. At this point, among the n error diffusion processing units, two error diffusion processing units that perform the halftone processing on two division images, respectively, which are adjacent to each other in the main scanning direction may perform simultaneously at least a part of the halftone processing on an (N+1)-th (N is an integer of 1 or more) raster of one division image that is positioned ahead in the main scanning direction, and at least a part of the halftone processing on an N-th raster of the other division image adjacent to the one division image. When one error diffusion processing unit that processes the division image positioned ahead in the main scanning direction processed the N-th raster up to an end portion in the main scanning direction to obtain diffusion errors that are diffused into pixels in the neighborhood of the objective pixel in the N-th raster in the end portion in the main scanning direction, the one error diffusion processing unit delivers a forward-direction diffusion error that is a diffusion error used by the other error diffusion processing unit and is determined for at least the N-th raster, among the diffusion errors, to the other error diffusion processing unit, before the other error diffusion processing unit starts the halftone processing on the N-th raster of the other division image. The other error diffusion processing unit may receive the determined forward-direction diffusion error in the N-th raster of the one division image from the one error diffusion processing unit, then may start the halftone processing on the N-th raster of the other division image, may obtain the diffusion error that is diffused into the pixels in the neighborhood of the objective pixel in the N-th raster in an end portion in a direction opposite to the main scanning direction, and then may deliver an opposite-direction diffusion error that is determined for at least the (N+1)-th raster, among opposite-direction diffusion errors that are diffusion errors which, among the diffusion errors, are used by the one error diffusion processing unit in the halftone processing on the (N+1)-th raster of the one division image, until the halftone processing on the (N+1)-th raster by the one error diffusion processing unit is performed on up to the end portion in the main scanning direction.

By doing this, the halftone processing that uses an error diffusion method for an image can be performed in a short time. However, although the number of error diffusion processing units increases of decreases, between two error diffusion processing units adjacent to each other, an error diffusion processing unit that processes the division image facing toward the main scanning direction may be set to be one error diffusion processing, the other may be set to be the other error diffusion processing unit. Thus, each error diffusion processing unit may perform the processing. Therefore, the number of error diffusion processing units can be increased or decreased extremely easily. Additionally, in the image processing apparatus, a storage capacity to store the diffusion error that is diffused into the pixels in the neighborhood for the error diffusion can be reduced.

[2] In the image processing apparatus, the one error diffusion processing unit and the other error diffusion processing unit may have a path through which data is directly exchangeable, and may exchange at least the determined forward-direction diffusion error and the determined opposite-direction diffusion error through the path. With this configuration, the forward-direction diffusion error and the opposite-direction diffusion error can be exchanged directly between the error diffusion processing units.

[3] In the image processing apparatus, the path may be a shared memory readable and writable from the two error diffusion processing units. If the shared memory is used, there is no need to set a protocol or the like for exchanging data for reading and writing.

[4] In the image processing apparatus, the n error diffusion processing units may share a transfer path through which data is exchangeable, and the one error diffusion processing unit and the other error diffusion processing unit may exchange at least the determined forward-direction diffusion error and the determined opposite-direction diffusion error through the transfer path. With this configuration, the exchange or the like of the diffusion error between each of the error diffusion processing units can be performed intensively along the transfer path, and a connection between the error diffusion processing units can be simplified. Furthermore, because the connection between each of the error diffusion processing units are made intensively along the transfer path, the increase and the decrease in the number of error diffusion processing units can be flexibly dealt with.

[5] In the image processing apparatus, the one error diffusion processing unit may not perform the halftone processing applied with the error diffusion method while the determined forward-direction diffusion error is output toward the other error diffusion processing unit, and the other error diffusion processing unit may not perform the halftone processing applied with the error diffusion method while the determined opposite-direction diffusion error is output toward the one error diffusion processing unit. With this configuration, the error diffusion method-based processing for each pixel that makes up a raster and the delivery of the diffusion error to an adjacent error diffusion processing unit can be reliably performed.

[6] In the image processing apparatus, the other error diffusion processing unit may not perform the halftone processing applied with the error diffusion method while the determined forward-direction diffusion error from the one error diffusion processing unit is input. With this configuration, the error diffusion method-based processing for each pixel that makes up the raster and the delivery of the diffusion error to the adjacent error diffusion processing unit can be more reliably performed.

[7] A second aspect of the present disclosure is directed to a printing apparatus. The printing apparatus includes any one of the image processing apparatuses described above, and a printing unit that forms a dot having a gradation value in accordance with processed data output by an output unit of the image processing apparatus and thus performs printing on a printing medium. With the printing apparatus, the halftone processing that uses the error diffusion method for an image can be performed in a short time, and the time it takes to complete printing can be shortened. Furthermore, the image processing apparatus that is included in the printing apparatus is the same as an image processing apparatus that operates as a separate single apparatus, in that merits, such that an increase and a decrease in the number of error diffusion processing units can be performed extremely easily or the storage capacity to store the diffusion error that is diffused into the pixels in the neighborhood for the error diffusion can be reduced, can be enjoyed.

[8] A third aspect of the present disclosure is directed to an image processing method that performs sequential halftone processing of a two-dimensional image, extending in lengthwise and crosswise direction and including a plurality of pixels, in one of the lengthwise and crosswise directions as a main scanning direction. The image processing method is performed by providing n (n is an integer of 2 or more) error diffusion processing units that are respectively provided to correspond to division images obtained by dividing the image into n images in the main scanning direction, sequentially sets pixels belonging to a raster which is a row of pixels in the main scanning direction of the division image as an objective pixel, and applies an error diffusion method to the objective pixel to perform the halftone processing. In the image processing apparatus, among the n error diffusion processing units, two error diffusion processing units that perform the halftone processing on two division images, respectively, which are adjacent to each other in the main scanning direction, perform simultaneously at least a part of the halftone processing on an (N+1)-th (N is an integer of 1 or more) raster of one division image that is positioned ahead in the main scanning direction, and at least a part of the halftone processing on an N-th raster of the other division image adjacent to the one division image. At this point, when one error diffusion processing unit that processes the division image positioned ahead in the main scanning direction processes the N-th raster up to an end portion in the main scanning direction to obtain diffusion errors that are diffused into pixels in the neighborhood of the objective pixel in the N-th raster in the end portion in the main scanning direction, the one error diffusion processing unit delivers a forward-direction diffusion error that is a diffusion error used by the other error diffusion processing unit and is determined for at least the N-th raster, among the diffusion errors, to the other error diffusion processing unit, before the other error diffusion processing unit starts the halftone processing on the N-th raster of the other division image. The other error diffusion processing unit receives the determined forward-direction diffusion error in the N-th raster of the one division image from the one error diffusion processing unit, then starts the halftone processing on the N-th raster of the other division image, obtains diffusion errors that are diffused into the pixels in the neighborhood of the objective pixel in the N-th raster in an end portion in a direction opposite to the main scanning direction, then delivers an opposite-direction diffusion error that is determined for at least the (N+1)-th raster among opposite-direction diffusion errors that are diffusion errors which, among the diffusion errors, are used by the one error diffusion processing unit in the halftone processing on the (N+1)-th raster of the one division image, until the halftone processing on the (N+1)-th raster by the one error diffusion processing unit is performed up to the end portion in the main scanning direction, combines results processed by the n error diffusion processing units and outputs processed data having a gradation value less than a gradation value that the division image has. With the image processing method, the same effect as in the image processing apparatus described above can be achieved.

The present disclosure is not limited to the embodiments and the implementation examples, which are described above, and can be realized with various configurations within the scope that does not depart from the gist of the present disclosure. For example, it is possible that technical features of the embodiment that correspond to technical features of the aspect that is described in Summary are suitably replaced or combined in order to solve one or several, or all of the problems described above or in order to accomplish one or several, or all of the effects described above. Furthermore, it is possible that the technical feature, if not described, as being essential, in the present specification, is suitably deleted. For example, a part of a configuration that is realized in hardware in the embodiment described above can be realized in software. Furthermore, it is also possible that at least a part of a configuration that is realized in software is realized by a discrete circuit configuration.

What is claimed is:

1. An image processing apparatus that sequentially performs halftone processing of a two-dimensional image, extending in lengthwise and crosswise directions and including a plurality of pixels, in one of the lengthwise and crosswise directions as a main scanning direction, the apparatus comprising:

n error diffusion processing units that are respectively provided to correspond to division images obtained by dividing the image into n images in the main scanning direction, sequentially sets pixels belonging to a raster which is a row of pixels in the main scanning direction of the division image as an objective pixel, and applies an error diffusion method to the objective pixel to perform the halftone processing, n being an integer of 2 or more; and an output unit that combines results processed by the n error diffusion processing units and outputs processed data having a gradation value less than a gradation value that the division image has, wherein among the n error diffusion processing units, two error diffusion processing units that perform the halftone processing on two division images, respectively, which are adjacent to each other in the main scanning direction simultaneously perform at least a part of the halftone processing on an (N+1)-th raster of one division image that is positioned ahead in the main scanning direction, and at least a part of the halftone processing on an N-th raster of the other division image adjacent to the one division image, N being an integer of 1 or more, when one error diffusion processing unit that processes the division image positioned ahead in the main scanning direction processes the N-th raster up to an end portion in the main scanning direction to obtain diffusion errors that are diffused into pixels in the neighborhood of the objective pixel in the N-th raster in the end portion in the main scanning direction, the one error diffusion processing unit delivers a forward-direction diffusion error that is a diffusion error used by the other error diffusion processing unit and is determined for at least the N-th raster, among the diffusion errors, to the other error diffusion processing unit, before the other error diffusion processing unit starts the halftone processing on the N-th raster of the other division image, and the other error diffusion processing unit receives the determined forward-direction diffusion error in the N-th raster of the one division image from the one error diffusion processing unit, then starts the halftone processing on the N-th raster of the other division image, obtains diffusion errors that are diffused into the pixels in the neighborhood of the objective pixel in the N-th raster in an end portion in a direction opposite to the main scanning direction, and then delivers an opposite-direction diffusion error that is determined for at least the (N+1)-th raster among opposite-direction diffusion errors that are diffusion errors which, among the diffusion errors, are used by the one error diffusion processing unit in the halftone processing on the (N+1)-th raster of the one division image, until the halftone processing on the (N+1)-th raster by the one error diffusion processing unit is performed up to the end portion in the main scanning direction.

2. The image processing apparatus according to claim 1, wherein the one error diffusion processing unit and the other error diffusion processing unit have a path through which data is directly exchangeable, and exchange at least the determined forward-direction diffusion error and the determined opposite-direction diffusion error through the path.

3. The image processing apparatus according to claim 1, wherein the one error diffusion processing unit and the other error diffusion processing unit have a path through which data is directly exchangeable, and exchange at least the determined forward-direction diffusion error and the determined opposite-direction diffusion error through the path, and the path is a shared memory which is readable and writable from the two error diffusion processing units.

4. The image processing apparatus according to claim 1, wherein the n error diffusion processing units share a transfer path through which data is exchangeable, and the one error diffusion processing unit and the other error diffusion processing unit exchange at least the determined forward-direction diffusion error and the determined opposite-direction diffusion error through the transfer path.

5. The image processing apparatus according to claim 1, wherein the one error diffusion processing unit does not perform the halftone processing applied with the error diffusion method while the determined forward-direction diffusion error is output toward the other error diffusion processing unit, and the other error diffusion processing unit does not perform the halftone processing applied with the error diffusion method while the determined opposite-direction diffusion error is output toward the one error diffusion processing unit.

6. The image processing apparatus according to claim 1, wherein the one error diffusion processing unit does not perform the halftone processing applied with the error diffusion method while the determined forward-direction diffusion error is output toward the other error diffusion processing unit, the other error diffusion processing unit does not perform the halftone processing applied with the error diffusion method while the determined opposite-direction diffusion error is output toward the one error diffusion processing unit, and the other error diffusion processing unit does not perform the halftone processing applied with the error diffusion method while the determined forward-direction diffusion error from the one error diffusion processing unit is input.

7. A printing apparatus comprising:

the image processing apparatus according to claim 1; and a printing section that performs printing on a printing medium by forming a dot having a gradation value that corresponds to the processed data output by the output unit.

8. An image processing method that sequentially performs halftone processing of a two-dimensional image, extending in lengthwise and crosswise directions and including a plurality of pixels, in one of the lengthwise and crosswise directions as a main scanning direction, the method comprising:

providing n error diffusion processing units that are respectively provided to correspond to division images obtained by dividing the image into n images in the main scanning direction, sequentially sets pixels belonging to a raster which is a row of pixels in the main scanning direction of the division image as an objective pixel, and applies an error diffusion method to the objective pixel to perform the halftone processing, n being an integer of 2 or more;

causing two error diffusion processing units that perform the halftone processing on two division images, respectively, which are adjacent to each other in the main scanning direction, among the n error diffusion processing units, to perform simultaneously at least a part of the halftone processing on an (N+1)-th raster of one division image that is positioned ahead in the main scanning direction, and at least a part of the halftone processing on an N-th raster of the other division image adjacent to the one division image, N being an integer of 1 or more;

when one error diffusion processing unit that processes the division image positioned ahead in the main scanning direction processes the N-th raster up to an end portion in the main scanning direction to obtain diffusion errors that are diffused into pixels in the neighborhood of the objective pixel in the N-th raster in the end portion in the main scanning direction, causing the one error diffusion processing unit to deliver a forward-direction diffusion error that is a diffusion error used by the other error diffusion processing unit and is determined for at least the N-th raster, among the diffusion errors, to the other error diffusion processing unit, before the other error diffusion processing unit stars the halftone processing on the N-th raster of the other division image;

causing the other error diffusion processing unit to receive the determined forward-direction diffusion error in the N-th raster of the one division image from the one error diffusion processing unit, then to start the halftone processing on the N-th raster of the other division image, to obtain diffusion errors that are diffused into the pixels in the neighborhood of the objective pixel in the N-th raster in an end portion in a direction opposite to the main scanning direction, and then to deliver an opposite-direction diffusion error that is determined for at least the (N+1)-th raster among opposite-direction diffusion errors that are diffusion errors which, among the diffusion errors, are used by the one error diffusion processing unit in the halftone processing on the (N+1)-th raster of the one division image, until the halftone processing on the (N+1)-th raster by the one error diffusion processing unit is performed up to the end portion in the main scanning direction; and combining results processed by the n error diffusion processing units and outputting processed data having a gradation value less than a gradation value that the division image has.

* * * * *